Aug. 22, 1961 C. F. McVOY, JR 2,997,076
COIL WINDING MACHINE
Filed Sept. 30, 1955 8 Sheets-Sheet 1
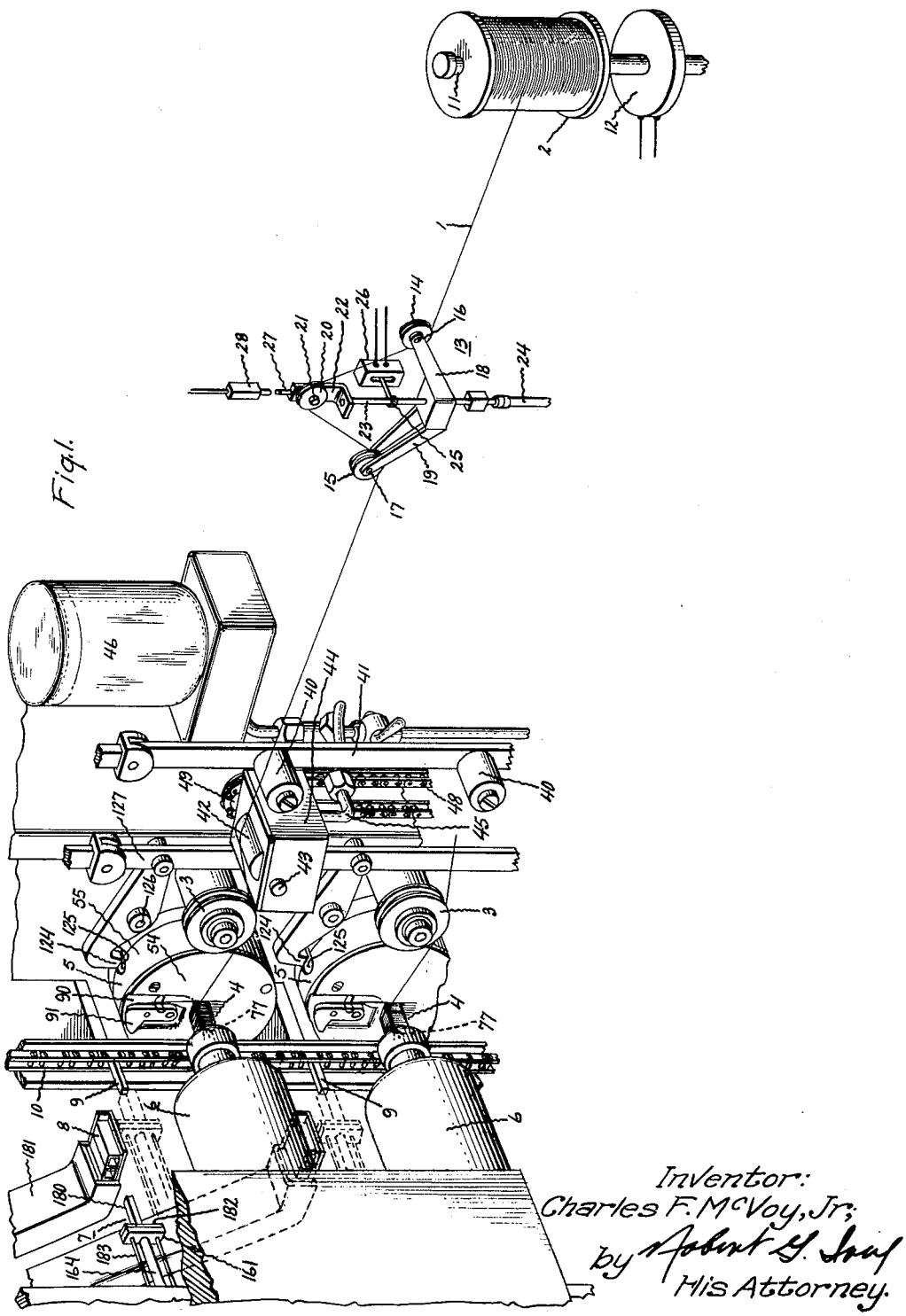
Inventor:
Charles F. McVoy, Jr.
by Robert G. Scott
His Attorney.

Aug. 22, 1961 C. F. McVOY, JR 2,997,076
COIL WINDING MACHINE
Filed Sept. 30, 1955 8 Sheets-Sheet 2
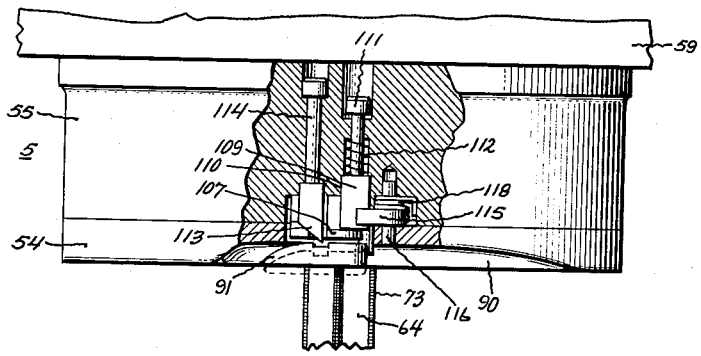
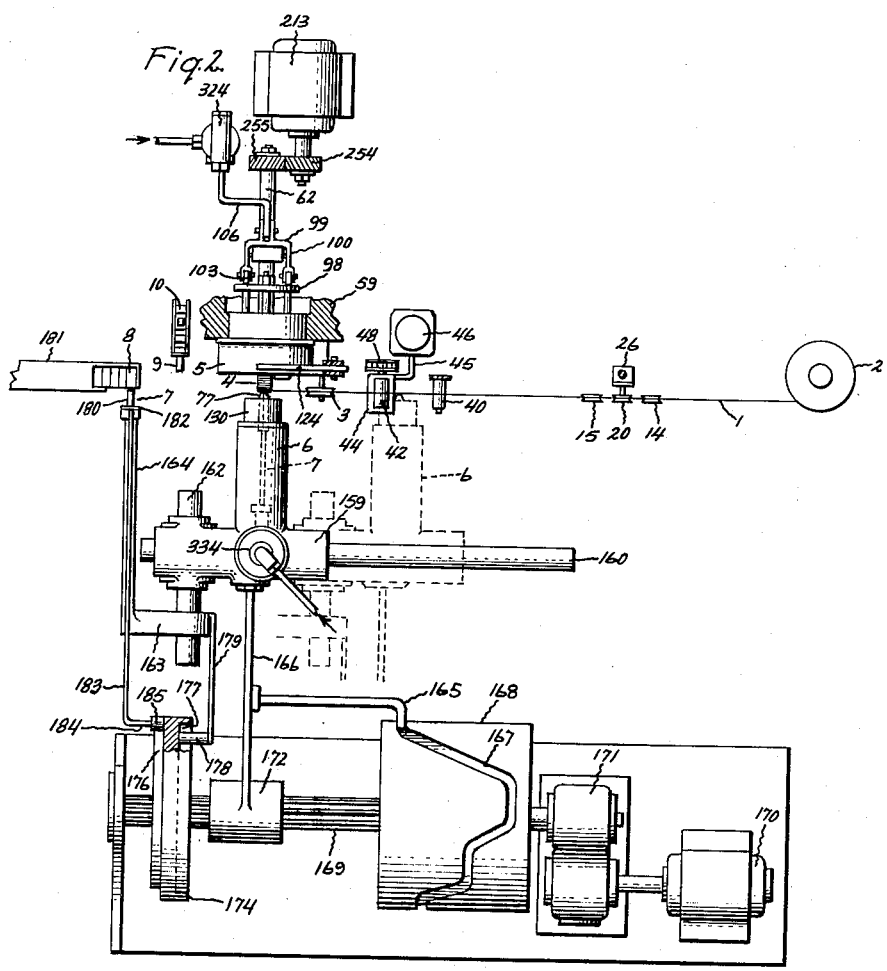
Inventor:
Charles F. McVoy, Jr,
by Robert G. Fries
His Attorney.

Inventor:
Charles F. McVoy Jr,
by Robert G. Iru
His Attorney.

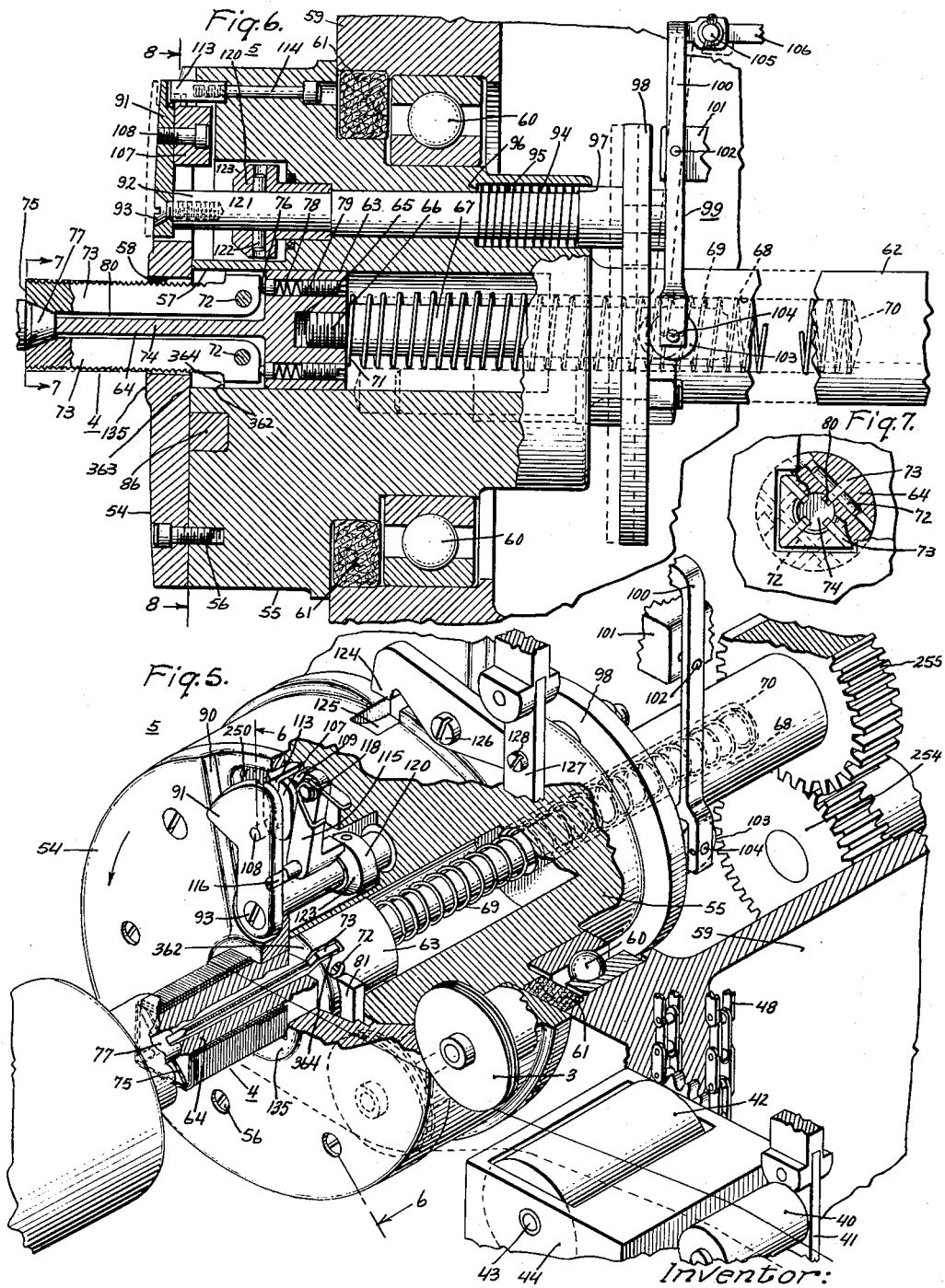

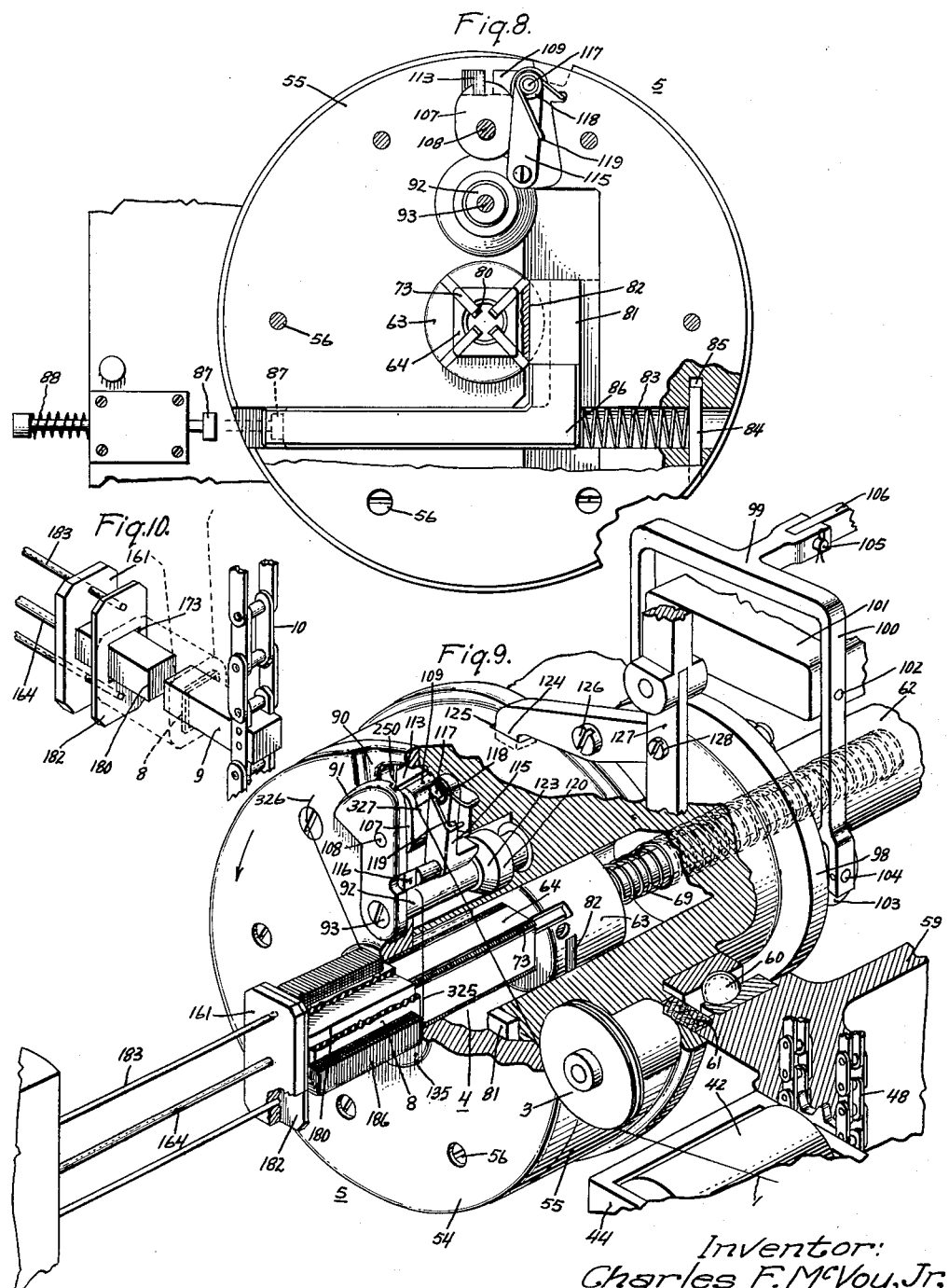

Aug. 22, 1961  C. F. McVOY, JR  2,997,076
COIL WINDING MACHINE
Filed Sept. 30, 1955  8 Sheets-Sheet 6
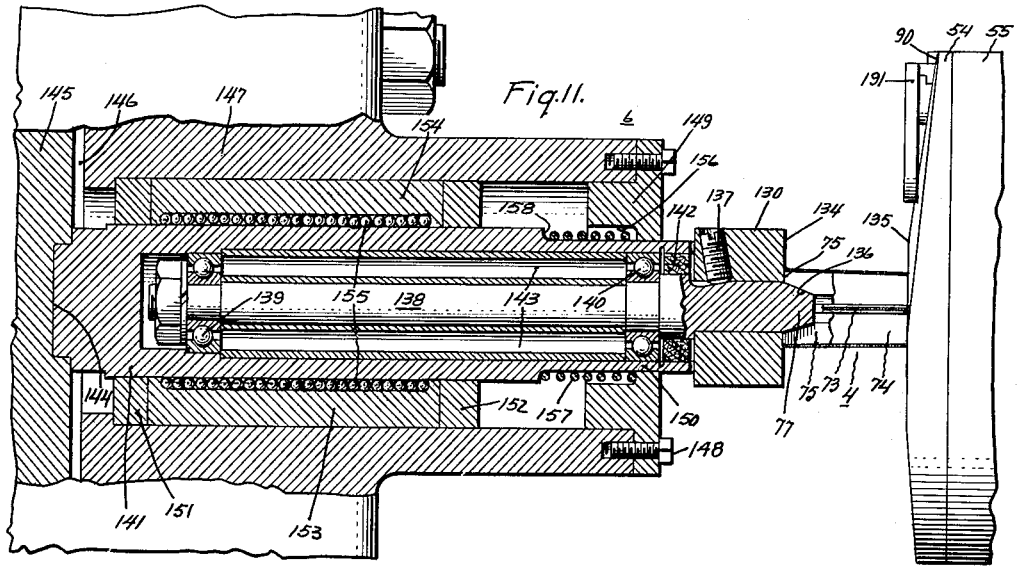
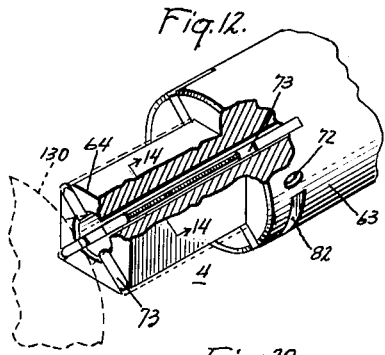
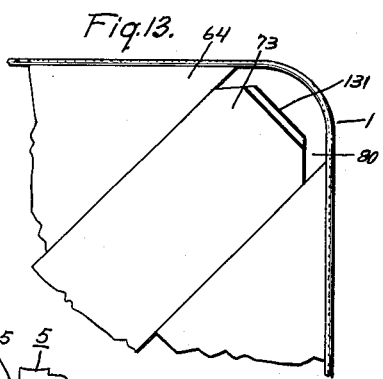
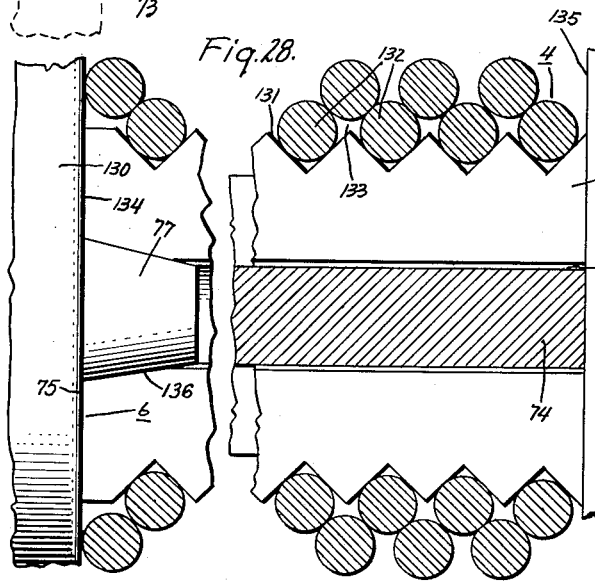
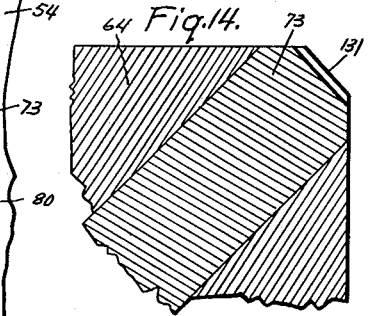
Inventor:
Charles F. McVoy Jr,
by Robert G. Irvy
His Attorney.

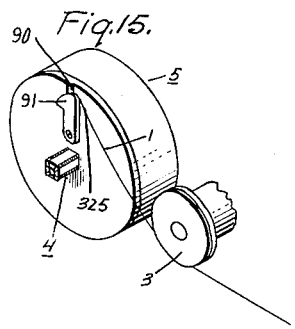
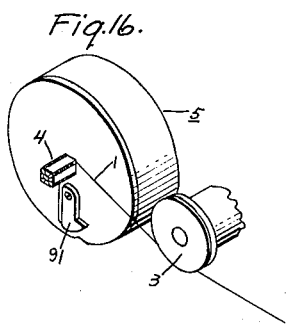
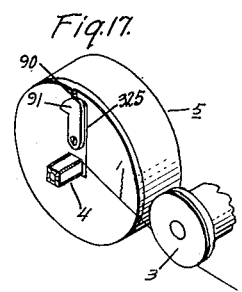
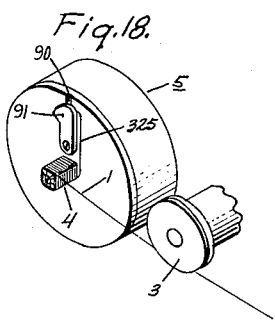
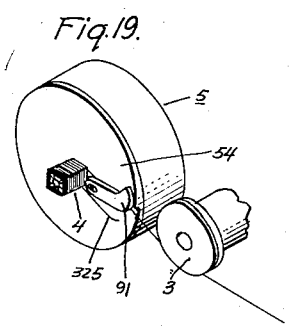
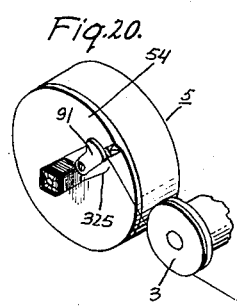
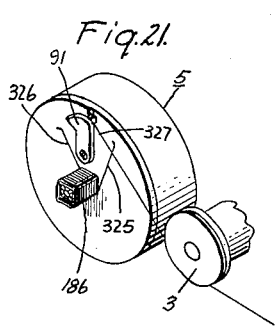
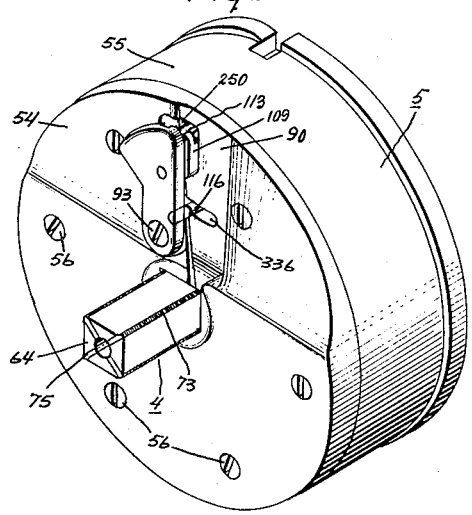

Aug. 22, 1961     C. F. McVOY, JR     2,997,076
COIL WINDING MACHINE
Filed Sept. 30, 1955     8 Sheets-Sheet 8
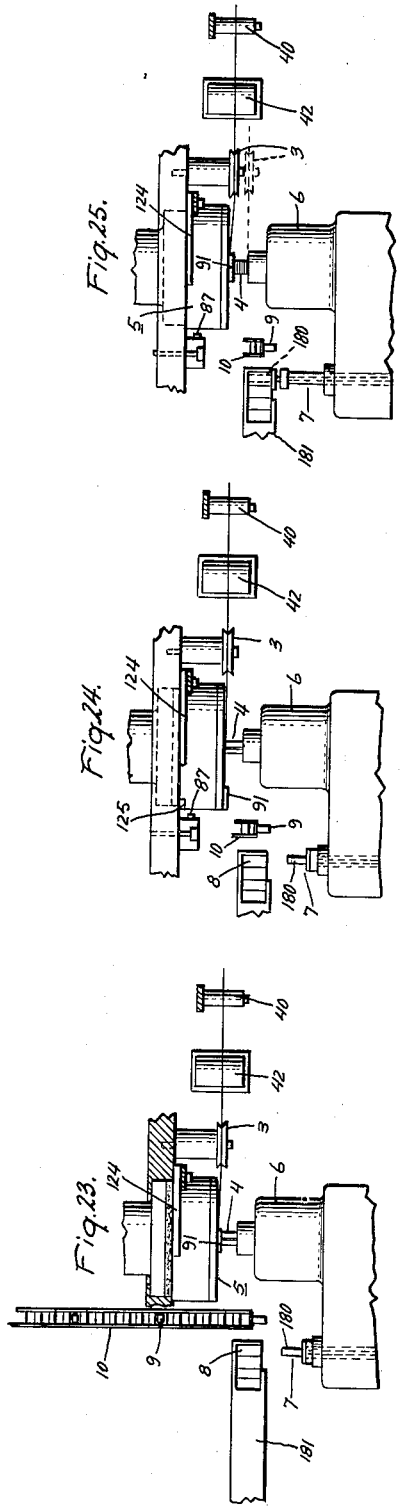
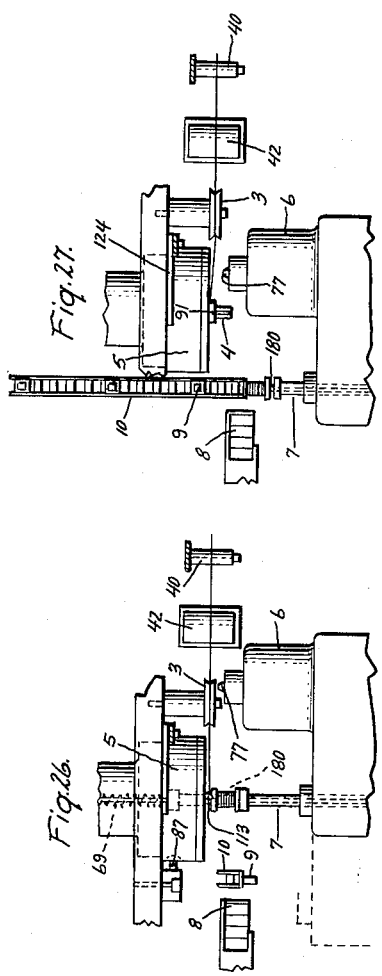
Inventor:
Charles F. McVoy, Jr,
by Robert G. Trius
His Attorney.

United States Patent Office 2,997,076
Patented Aug. 22, 1961

2,997,076
COIL WINDING MACHINE
Charles F. McVoy, Jr., Danville, Ill., assignor to General Electric Company, a corporation of New York
Filed Sept. 30, 1955, Ser. No. 537,659
27 Claims. (Cl. 140—1)

This invention relates to machines for winding electric coils, and more particularly to an automatic machine for forming precision-wound coils.

As the use of electrical machinery of all types has become widespread, more and more effective methods and machines for winding electrical coils for use in dynamo-electric machinery and stationary inductive devices have been brought about. Particularly in connection with the latter group, multiple-layer, relatively elongated coils have proved most satisfactory. Such coils have, in the past, generally been formed on paper spools which served the double function of insulating the coil from the magnetic core of the device and of supporting the coil. The coil itself was then generally formed on the spool in layers, with a layer of wire being formed and then a layer of paper insulation, with the process being repeated until the coil was entirely formed. The paper was necessary between the layers of wire to keep each layer flat and to insulate each layer of wire from the other. The insulation of the layers from each other was, in turn, necessary because of the fact that each turn the wire could move relative to the other turns, and so rubbing between the layers might occur with, consequently, damage to the wire insulation, and short circuits. While such arrangements were effective, they took up a considerable amount of space because of the complete separation of layers of wire and the necessity for intervening layers of paper. In addition, such arrangements also utilized more material due to the fact that the provision of intervening layers of paper required the coil to be of a larger mean diameter than would otherwise have been the case. The necessity for the wire and the paper also caused the winding operation to take considerably longer than would otherwise be necessary and caused it to be considerably more expensive because of the more complex machinery required and the greater time needed for each unit to be wound.

To avoid these difficulties, there arose a type of coil for stationary induction apparatus whereby the coils of wire were "precision-wound." With this arrangement, each turn of wire nests between two wires of the layer below it. This provides a much better space factor than with the paper-separated layers so that it is possible to achieve smaller coils. The elimination of the paper, however, has required that the coils of wire be substantially precluded from movement relative to each other and has necessitated the bonding of each turn of the precision-wound coil to the adjacent turns so that the wire would be completely fastened in place and could not move. While such a structure has the previously mentioned advantages of space saving and material saving, the formation of such coils has until now been a relatively slow and expensive operation, particularly where relatively small wire sizes were used, since the machines which had been adapted to form coils of the old type could not be made operative to form the new type of coils. This has held up the large scale manufacture of precision-wound coils to a certain extent (which increases considerably as the wire size decreases) despite the space and material savings. It is, accordingly, highly desirable to provide a machine which will form precision-wound coils speedily and relatively simply so as to reduce the expense of winding them. Such a machine should also take care of inserting insulation on the inside of the coil formed (to separate it from the magnetic core when it is assembled thereon) since precision-wound coils are formed directly on an arbor which does not permit the use of an inner paper spool since the arbor must be so formed that each wire be positioned in a particular manner with respect to the adjacent turns of wire.

It is, therefore, an object of this invention to provide an improved coil-winding machine.

A further object of the invention is to provide an improved machine for forming precision-wound coils.

Yet another object of this invention is to provide an improved machine for winding precision-wound coils which will incorporate the advantageous features discussed above.

Further objects and advantages of this invention will become apparent and the invention will be better understood by reference to the following description and the accompanying drawings, and the features of novelty which characterize this invention will be pointed out with particularity in the claims annexed to and forming a part of this specification.

In its broader aspects, this invention provides a machine for forming wire into precision-wound coils which has means for winding the wire. A supply of adhesive is provided, and, in combination therewith, there are means to coat at least a part of the surface of the wire with the adhesive before it reaches the winding means. By this arrangement each turn will bond itself to the two turns beneath it on which it nests as it is wound thereon. The wire is wound on an arbor included in the winding means, and means are provided to maintain the wire out of contact with the coating means while the first layer is being wound on the arbor.

With particular reference to the feeding of the wire to the winding means, guide means are provided for the wire to determine its location relative to the longitudinal axis of the arbor. The guide means are axially movable a predetermined amount at a predetermined time during each revolution of the winding means and for a predetermined part of each revolution; this arrangement causes the wire to cross-over itself to form a new turn at the same circumferential location on the arbor each time.

In the drawings, FIGURE 1 is a view in perspective of the major portion of the improved coil winding machine of this invention;

FIGURE 2 is a plan view of the machine, partly in cross section;

FIGURE 3 is an enlarged view, partly broken away and partly in cross section, of the winding head of the machine;

FIGURE 5 is a view in perspective, partly cut away and partly in cross section, of the winding head of the machine;

FIGURE 6 is a view in cross section along line 6—6 in FIGURE 5;

FIGURE 7 is a fragmentary view in cross section along line 7—7 in FIGURE 6;

FIGURE 8 is a view along line 8—8 in FIGURE 6;

FIGURE 9 is a view similar to that of FIGURE 5 at a different point in the operation of the machine;

FIGURE 10 is an enlarged fragmentary view of the coil stripping mechanism of the machine;

FIGURE 11 is a side view, partly broken away and partly in cross section, of the tail stock, arbor, and winding head of the machine;

FIGURE 12 is an enlarged fragmentary view in perspective, partly broken away and partly in cross section, of the arbor of the machine;

FIGURE 13 is a fragmentary enlarged end view of a portion of the arbor of the machine;

FIGURE 14 is a cross sectional view along line 14—14 in FIGURE 12;

FIGURES 15 through 21 are a series of views in perspective illustrating the operation of the winding head and the arbor of the machine;

FIGURE 22 is an enlarged view in perspective of the winding head and arbor of the machine;

FIGURES 23 through 27 are a series of plan views illustrating the over-all operation of the machine; and FIGURE 28 is an enlarged side view, partly in cross section, of the winding arbor.

Figure 4:
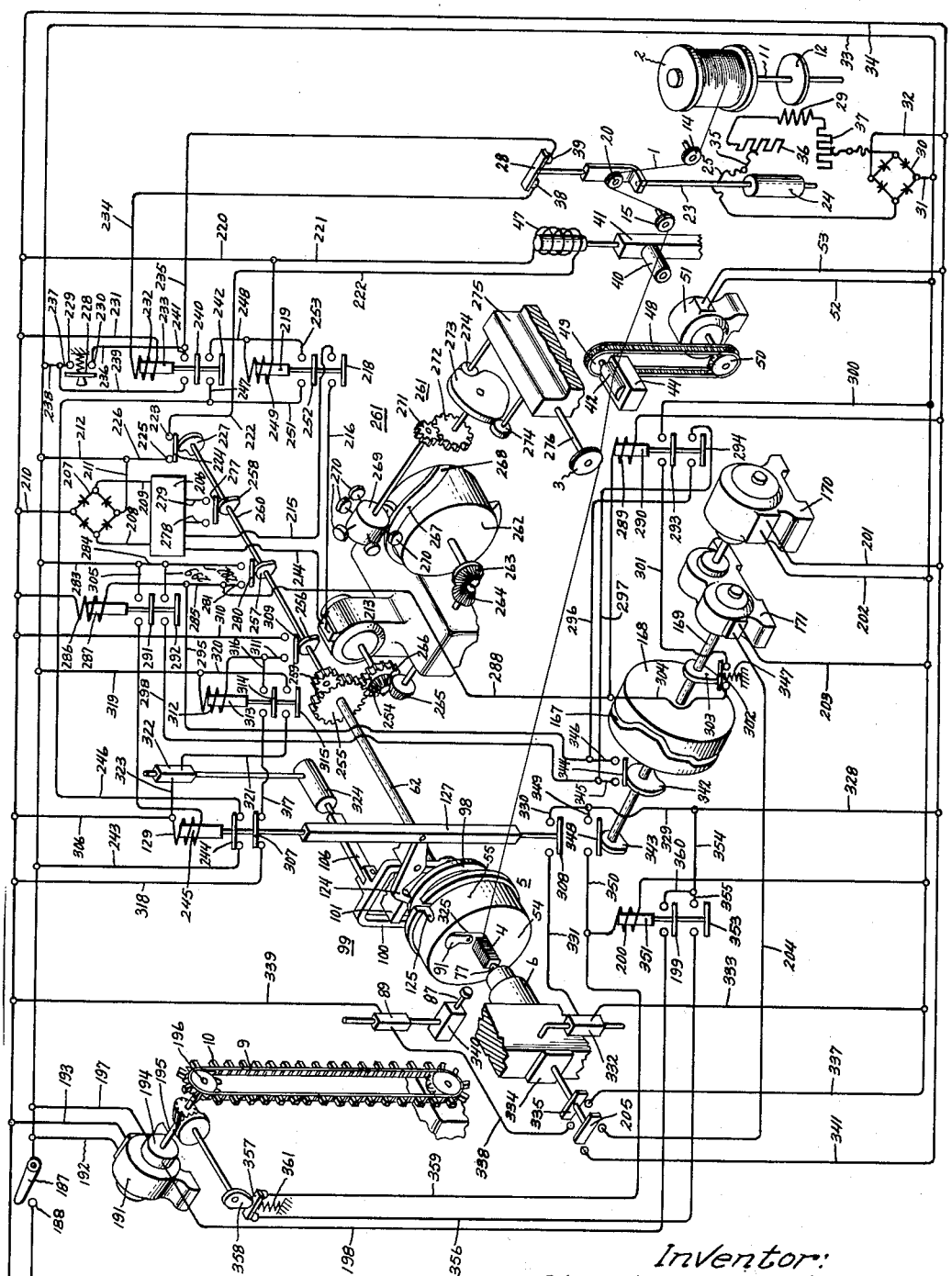
FIGURE 4 is a schematic diagram, partly in perspective, showing both the operative relationship of the parts of the machine and the electrical control circuits associated therewith.

Referring first to FIGURE 1 of the drawings, a very brief description of the broad functioning of the machine will be given to facilitate understanding of the complete description, first of the parts and then of the functioning of the machine, that will follow. Magnet wire, illustrated at 1, is supplied from a spool 2 under a traversing roller 3 to an arbor 4 secured to rotate with a winding head 5 so as to cause the wire to form a coil on the arbor. During the operation, a tail stock assembly 6 is in engagement with the arbor 4. After the winding operation is completed, tail stock assembly 6 moves out of engagement with the end of the arbor and a spool loading finger assembly 7, which has picked up a kraft paper spool 8, pushes arbor 4 back into head 5 and forces spool 8 within the coil which was formed on the arbor. Assembly 7 then moves out of engagement with the arbor and deposits the formed coil with the spool located therein on a peg 9 on a conveyer chain 10 which removes the finished coil from the machine.

The spool 2, which supplies the wire 1 to the machine, is securely mounted on a shaft 11 which is rotatably mounted by means not shown. The degree of freedom of rotation of shaft 11, and, therefore, the degree of tension on wire 1 is controlled by a braking device 12 which is adjustable in order to provide the desired wire tension. This device may be of any desired type, such as, for instance, any one of several electromagnetic types of brakes.

In order to control the tension of the wire to meet machine running requirements, a device 13 is provided; wire 1 passes beneath a pair of pulleys 14 and 15 which are respectively rotatably mounted on pins 16 and 17 at the ends of arms 18 and 19 rigidly secured in any desired manner so as to be immovable. Between pulleys 14 and 15, the wire passes over a pulley 20 rotatably mounted on a pin 21 which is secured to an angle member 22. The angle member in turn is secured at the end of a rod 23 which is constantly biased upwardly by air pressure coming from a cylinder 24. A control member 25 is secured to rod 23 and extends within a control box 26. As will be explained below, control box 26 is electrically connected to brake member 12 so as to control the amount of excitation supplied to the brake member and thus adjust the tension of wire 1. As the wire tension decreases, the air pressure will move rod 23 upwardly, thus changing the setting of control box 26 to effect an adjustment in the tensioning of the wire by the brake 12. If the wire should break, extending portion 27 will be forced upwardly through the action of air cylinder 24 into engagement with switch 28. As will be more fully explained below, actuation of switch 28 will permit the machine which is to be described herebelow to complete a winding cycle, but will stop it at the end of the cycle, so that, when the broken wire is restored, the machine will again be in readiness for operation.

Referring to FIGURE 4, it will be seen that brake member 12 may be provided with a field winding 29 which is energized from a rectifier 30 receiving alternating current power through lines 31 and 32 connected respectively to supply lines 33 and 34. It will be seen that the position of rod 23 as determined by the joint action of air cylinder 24 and the tension of wire 1 will determine the setting of contact member 35 on variable resistance 36. Returning for an instant to FIGURE 1, it will be seen that control member 25 may be secured to contact member 35 to effect the control by rod 23. Since the air pressure is constant, contact member 35 will be moved by member 25 in accordance with the tension in wire 1 and may be adjusted so as to maintain that tension at a substantially constant value by suitable variation of the resistance in series with field winding 29 of brake member 12. Variable resistor 37 is also arranged in series with field winding 29 of brake member 12 in order to predetermine the wire tension; once the setting is made, variable resistor 36 will then operate to maintain the tension at that predetermined level, compensating automatically for the amount of wire on the spool and for the acceleration and deceleration of the mass at the start and finish of a winding cycle. It will also be observed in FIGURE 4 that switch 28 is normally closed, and that the contacts 38 and 39 are opened only in the event wire 1 breaks and permits rod 23 to rise to open the switch.

Returning to FIG. 1, after it has passed through device 13, the wire passes over a roller 40 rotatably mounted on a bar member 41. The location of roller 40 determines whether the wire will be allowed to engage the surface of a second roller 42 which is rotatably mounted on a shaft 43 secured in box 44 which is arranged to be supplied with a suitable adhesive through a pipe line 45 which extends from a reservoir 46 of the adhesive, as shown. The reservoir for the adhesive may be a standard glass jar-type member having an opening (not shown) at its lower end. Means (not shown) may be provided in box 44 to control the amount of adhesive picked up by roller 42 so that it will act as an applicator to apply the adhesive to a predetermined circumferential amount of the wire. This amount is preferably maintained at no more than half the circumference so that the adhesive will not foul pulley 3 as the wire passes under it.

Referring again to FIGURE 4, it will be seen that the position of roller 40 and bar 41 is controlled by the energization of a solenoid coil 47. When coil 47 is energized, bar 41 is pulled up and roller 40 consequently lifts the wire out of engagement with roller 42 for a purpose which will be explained herebelow. Except when solenoid coil 47 is energized to raise roller 40, the wire is in contact with the surface of roller 42, as explained above. This roller is driven through any desired means, such as chain 48 and sprockets 49 and 50, by a motor 51 connected across lines 33 and 34 by lines 52 and 53 respectively. This arrangement ensures that the wire will receive a positive supply of adhesive and will be coated with the adhesive on one side after leaving the roller 42.

The wire then passes under traversing pulley 3 which is arranged to make a small movement after each turn of wire is wound, as will be more fully explained herebelow, so that each new turn of wire will be correctly positioned beside the previously formed turn. After it leaves pulley 3, the wire extends to the winding head 5 where it is secured, as will be explained herebelow.

Referring particularly to FIGURES 3, 5, 6, 7, 8, 9, and 22, the construction of the winding head will now be fully explained. The winding head 5 is provided with a cover member 54 which is secured to the main body portion 55 of the head by a plurality of threaded members 56. A central opening 57 is provided in the body portion 55 to accommodate the arbor assembly (to be described below), and the arbor 4 extends through a central opening 58 in cover member 54. The entire winding head 5 is rotatable in a housing 59 on an antifriction bearing 60. A lubricating wick 61 may be arranged between housing 59 and body portion 55 of head 5 so as to lubricate bearing 60. To effect rotation of head 5, a shaft 62 is secured to the body portion 55 and is adapted to be rotated by means which will be described herebelow. Portion 63 of arbor 4 is slidably mounted in the opening 57 formed in body portion 55, and a forward portion 64, which forms the main body of the winding arbor 4 of the machine is integrally secured at one end to portion 63 so as to be coaxial therewith and with winding head 5. Portion 63 has a threaded opening 65 which is arranged to be in threaded engagement with the end 66 of a rod 67 which extends back into an opening 68 within the shaft 62. Rod 67 is arranged to form an inner guide for a spring 69 which is seated at one end against the end 70 of the opening within shaft 62 and at the other end against the rear surface 71 of arbor portion 63. It will thus be seen that portion 63 is under a constant biasing action from spring 69 which urges it toward the front of the winding head 5. The forward operative position of portion 63 is determined by the engagement of shoulders 362 of portion 63 with the back 363 of cover member 54.

Pivotally secured within recesses 364 of arbor portion 63 by pins 72 are four fingers 73. This arrangement can best be seen in FIGURE 7 which also shows the manner in which the fingers 73 and arbor portion 64 cooperate to form an arbor having a substantially uniform rectangular, or square cross section to provide for the winding of a square coil. It will, however, be understood that portion 64 and fingers 73 may be made to form any desired polygonal or curved cross sectional configuration. Referring to FIGURES 6 and 7 together, it will be seen that fingers 73 are positioned within slot-like recesses 80 in portion 64, and that the recesses are slightly deeper than the fingers 73 so that when the fingers are held parallel to arbor part 64, they are slightly spaced from center part 74 of portion 64 which forms the bottom of recesses 80. The ends 75 of the fingers are biased inwardly by the pressure of members 76 which bear against the fingers so as to pivot them about pins 72 and cause fingers 73 to move inwardly within recesses 80. During a winding operation, this tendency is prevented from occurring by the wedge member 77 of tail stock assembly 6 which will be described in greater detail herebelow. The pressure of members 76 against fingers 73 is achieved by springs 78 seated against threaded members 79 secured within arbor portion 63. It will thus be observed that when wedge 77 is removed, springs 78 will cause parts 76 to bear against the fingers which will pivot ends 75 about pins 72 inwardly within the grooves 80. The construction of the arbor will be further discussed herebelow.

While spring 69 biases arbor 4 into its operative position, the precise nature of the work makes it desirable to utilize a latch to lock the arbor into operative position during a coil winding operation. For this purpose, there is provided a latch member 81 (best seen in FIGURES 5 and 8) which is adapted to enter a groove 82 formed in the side of portion 63. A spring 83 seated against a member 84 arranged in a slot 85 within body portion 55 of winding head 5 is arranged to bear against the base 86 of latch 81 to bias it into locking position with the groove 82 in portion 63. Latch 81 is adapted to be moved out of engagement with groove 82 by a pusher member 87 which is normally biased away from the latch by a spring 88. A solenoid controlled valve 89 (see FIGURE 4), whose operation will be more fully explained herebelow, is arranged to control the actuation of pusher member 87 to disengage latch 81 at the proper time.

Referring now again to FIGURES 5 and 6, a recess 90 is provided in cover member 54 and is adapted to receive a finger-shaped wire clamp member 91, which is secured by a threaded fastener 93 to a rod member 92 extending through body portion 55 of the winding head 5. In this position, finger 91 is axially removed from the portion 64 of arbor 4 on which the coils are formed. An additional recess 94 is provided in the body portion, and the spring 95 seats at one end against the end 96 of the recess and at the other end against the shoulder 97 of the rod. By this means, spring 95 is arranged to bias the rod toward the rear of the winding head 5 thereby pulling clamping finger 91 back into recess 90. The rod member 92 is secured at its back to a disc-like member 98 which is in turn actuated by a clevis 99 having legs 100 straddling cast part 101 of the housing and pivoted thereon by pins 102. At the base of each leg, a roller member 103 is rotatably mounted to each leg 100 by a pin 104 and is arranged to bear against the surface of disc 98. Member 99 is connected through a pin 105 to a bar 106 which in turn is adapted to be pulled to the right (as viewed in FIGURE 6) by means which will be described in additional detail herebelow.

When rod 106 is pulled to the right, roller wheels 103 are forced against disc 98 and consequently the disc and rod 92 are moved forward to the left (FIGURE 6) against the action of spring 95, and clamping finger 91 is forced out of recess 90 and forward from the face of the winding head 5. In this position, finger 91 is now axially aligned with part of operative arbor portion 64 for a purpose which will be explained herebelow. In order to secure the wire 1 for a winding operation, a block 107 is firmly secured to clamping finger 91 by threaded means 108. Mounted in cooperative relationship with block 107 there is provided a second block member 109 (FIGURE 3) extending through slot 250 in cover 54 (FIGURE 22) which is seated in a recess 110 in body portion 55. Block 109 is secured within the recess by means of member 111 and is resiliently mounted therein by means of spring 112 placed between the bottom of the recesses and block 109. When finger 91 is in position within recess 90, blocks 107 and 109 are in tight engagement. The wire 1 passes between the two blocks at the time that finger 91 is moved forward into axial alignment with part of portion 64 so that when the finger moves back out of alignment and the blocks come together, the wire will be carried and held there in readiness for a winding operation.

Mounted to cooperate with finger 91 during the same sequence of movement, there is provided a cut-off blade 113 secured within body portion 55 by member 114 and also extending through slot 250 in cover member 54. As stated before, and as will be set forth in detail below, wire 1 is caused to come behind finger 91 when the finger is moved to its outward position. When the finger is moved back into recess 90, in addition to clamping the wire between blocks 107 and 109, cut-off blade 113 will cooperate with the back of finger 91 to cut the wire at a point beyond blocks 107 and 109 so that the cutting will have no effect on the clamping of the starting end of the wire, as will be explained further. The cutting off of the wire at this point releases the previously formed coil from the source of wire at the same time that blocks 107 and 109 position the starting end of the next coil to be formed.

When finger 91 moves out of recess 90, it releases the starting end of the wire by separation of blocks 107 and 109. It is necessary to kick the released starting end out from behind finger 91, otherwise there is the risk that the starting end of the finished coil will be clamped again when the finger moves back into recess. To achieve this effect, a member 115 (FIGURES 5 and 8) is provided with a projecting portion 116 extending through slot 336 in cover member 54 (FIGURE 22), and is pivoted on a pin 117 secured within body portion 55 of winding head 5. Member 115 is biased to the left, as seen in FIGURE 5, by a hairpin spring 118 which bears against member 115 at 119. In order to actuate the member 115, a cam member 120 (FIGURE 6) is secured to portion 121 of rod 92 by a pin 122. When the rod 92 is moved forward to move finger 91 out of recess 90, camming surface 123 of cam 120 will engage member 115. The camming surface is so formed as to force member 115 to the right, as seen in FIGURE 5, and this action will therefore cause projecting portion 116 to kick out the loose starting end 325 of the finished coil 186, as seen in FIGURE 9.

It is important in the forming of a precision-wound coil that the winding head stop at the precision predetermined point. In order to achieve this effect, the movement of winding head 5 is stopped at the end of a winding operation by the engagement of a latch member 124 within a recess 125 in the surface of body portion 55 of head 5. Latch 124 is pivotally mounted on a member 126 which is secured to the housing (not shown), and is arranged to be actuated by a bar 127 to which it is secured by a threaded device 128. As seen in FIGURE 4, bar 127 is actuated by the energization of a solenoid 129, as will be more fully explained herebelow. Latch 124 is pivoted into position to enter recess 125 upon energization of the solenoid; otherwise, in the de-energized position of the solenoid, bar 127 maintains latch 124 out of recess 125 so that winding head 5 is free to rotate.

Referring now to FIGURES 6, 12, 13, 14, and 28, the construction of arbor 4 on which the coil is formed will be set forth in detail. As already stated, the arbor consists of a main portion 63 which is within the winding head 5 and an operative portion 64, which, in the present case is provided with a square cross section so as to form square coils. It will, however, be clear, that the coils may be formed with substantially any desired cross section by proper selection of the shape of the arbor. The four inwardly extending recesses 80 are provided in portion 64 and the fingers 73 are arranged therein, as previously explained, with a small clearance between the center portion 74 of arbor body 64 and the bottom of each finger when the fingers are in coil-winding position. When the fingers are maintained in the position shown in FIGURES 5 and 6 by wedge 77 of tail stock member 130 (which is part of assembly 6), the fingers 73 and arbor portion 64 have the relationship shown in FIGURE 14, that is, the finger, with its surface substantially co-extensive with the top of recess 80, actually is a corner of the body and forms a smooth continuation thereof. However, when, after a winding operation has been completed, wedge 77 is withdrawn, the pressure of parts 76 on the fingers 73 will cause the fingers to pivot inwardly about pins 72 to move inwardly in recesses 80 so that they have the relationship to arbor portion 64, shown in FIGURE 13, whereby the surface of each finger 73 is below the top of its recess 80. The manner in which the four fingers are respectively arranged in the recesses to form the corners of the square cross section of arbor 4 is best seen in FIGURE 12.

Each finger 73 has a series of grooves 131 formed on its surface extending through the operative axial length of the arbor, as best seen in FIGURE 28. These grooves are provided in order to position the first layer 132 of wire with accuracy when it is wound on the arbor and are preferably formed. A clearance, shown at 133, is provided between each two turns of wire in order to accommodate variations in the wire diameter. In this manner, each two adjacent turns of wire form a nest of predetermined dimensions in which a turn of the next layer of wire will lie. It will be noted in FIGURE 28 that when wedge 77 of assembly 6 is in position and the arbor 4 is fully pushed out of winding head 5 and latched into position (FIGURE 8), surfaces 134 of the tail stock assembly and 135 of the winding head cover member 54 are so positioned that they will each cause the last turn of wire wound in a layer to be positioned a predetermined amount above the previous turns so as to become the first turn of the next layer of wire. For practical purposes, this can be achieved by placing the surfaces either half a groove over from the last groove, as was done with surface 134, or directly at the edge of the last groove as was done with surface 135. Thus, the arrangement of the winding arbor and the positioning of tail stock member 130 and winding head 5 provide a coil wherein each turn is precisely positioned with all turns except those of the first layer nesting between the two turns of wire in the layer below it and those of the first layer being positioned by grooves 131. As stated before, it is necessary for the end 75 of fingers 73 to be engaged by wedge 77 of tail stock assembly 6 in order for the fingers 73 to be spread apart into operative coil forming position. This is achieved by the positioning of the wedge 77 within tapered opening 136 against the ends 75 of fingers 73.

Referring now to FIGURE 11, the surface 134, previously mentioned, is provided by part 130 of assembly 6 which is secured to wedge 77 by a threaded member 137 which permits accurate positioning of part 130. Wedge 77 forms the end of a shaft member 138 rotatably mounted on bearings 139 and 140 which have their outer races secured within a sleeve member 141. Wicking 142 is provided adjacent bearing 140, and a plurality of tubes 143 are arranged around shaft 138 so that when the shaft rotates, the tubes 143 will rotate therearound. By means of these tubes, the lubricant from wicking 142 may be used to lubricate both bearings 140 and 139. With this arrangement, it will be seen that shaft 138, and consequently wedge 77 and part 130 are freely rotatable within non-rotatable sleeve member 141. It is necessary for wedge 77 and part 130 to rotate because of their engagement with the end of arbor 4 and the fact that the arbor is rotated to perform the winding operation. The back 144 of sleeve 141 is secured to a member 145 which is adapted to be movable a predetermined amount which is, however, less than the clearance 146 between part 145 and housing part 147. The means for effecting the movement and for limiting it may be of any desired type (such as a suitable camming arrangement) and are not shown in the drawings. Housing part 147 is in turn secured by threaded members 148 to front piece 149 which has an inner bore 150 in sliding engagement with sleeve member 141. A pair of rings 151 and 152 are secured to member 147 and between them there is provided an axial bearing 153 to permit relative axial motion between sleeve 141 and housing part 147. As shown, bearing 153 may be of the type wherein a tube 154 secured to member 147 has a plurality of ball members 155 which are in rolling engagement with sleeve member 141. In this manner, the sleeve member, and consequently wedge 77, are free to be moved by member 145 relative to member 147 and front piece 149. Front piece 149 is further provided with a recess 156, and a spring 157 has one end seated within the recess and the other end seated against shoulder 158 of sleeve member 141 so as to bias sleeve 141 and wedge 77 back within housing part 147. Thus, only under predetermined circumstances, which will be more fully discussed below, is wedge 77 moved forward against the bias of spring 157 to enter opening 136 to engage ends 75 of fingers 73.

Referring now to FIGURE 2, it will be seen that tail stock assembly 6 is formed at its rear with a housing part 159 which is arranged to be slidably mounted on a traverse guide rail 160. Housing part 159 has secured thereto a loading assembly guide rail 162 arranged substantially perpendicularly to guide rail 160. Slidably mounted on guide rail 162 is a member 163 of spool loading finger assembly 7 which is secured through a rod 164 to a guide member 161 (FIGURE 10) and loading finger member 180. It will be seen from the relationship of the parts just described, that movement of tail stock assembly 6 along rail 160 will cause a corresponding movement of the loading finger assembly 7 so that as tail stock assembly 6 moves axially (as seen in FIGURE 2), i.e., away from the arbor 4 and winding head 5, loading finger assembly 7 will be moving toward the arbor and the winding head.

A cam follower member 165 is scured to tail stock assembly 6 through a member 166 and is arranged to be engaged within the cam track 167 of a barrel cam 168 which is mounted on splined shaft 169 so as to rotate therewith. Shaft 169 is actuated by a motor 170 through a combination clutch and gear reduction assembly 171 which may be of any standard type and is not further described herein. A cylindrical member 172 rotatably and slidably mounted upon shaft 169 may be secured to the end of member 166 to provide support therefor.

Slidably secured to shaft 169 so as to rotate therewith, there is also provided a disc-like cam member 174 which is provided with face cam 176 and track cam 177. A cam follower 178 is secured at the end of a member 179 which is in turn secured to part 163 mounted on rail 162. When splined shaft 169 rotates, it causes rotation of cam member 174 and consequently track cam 177 will control the position of cam follower 178 which will in turn control the location of member 163. By this means, member 163 may be moved transversely a short distance so that finger 180 positioned at the end of rod 164 will in turn move into a kraft paper spool 8, having approximately the same cross sectional configuration as arbor portion 64, which is maintained in readiness at the bottom of a chute 181. These parts may be seen to advantage in FIGURE 1 as well as in FIGURE 2.

A stripper member 182 having an opening 173 (FIG-URE 10) is slidably mounted relative to rod 164, with finger 180 extending freely through opening 173, by means of supporting members 183 which are slidably supported at their ends by guide member 161, and which are secured at their other ends 184 to a cam follower member 185 in engagement with face cam 176. Rotation of cam member 174 as a result of rotation of shaft 169 will thus cause cam follower 185 to be moved by cam surface 176. Thus, stripper member 182 may be moved relative to rod 164 for a purpose which will be described herebelow.

When the tail stock assembly 6 and the loading finger assembly 7 reach the position shown in dotted outline in FIGURE 2, loading finger 180 is in direct alignment with arbor 4. At this time, as will be explained below, latch 81 (FIGURE 8) is removed from engagement in groove 82 in arbor portion 63 so that finger 180, with a spool 8 thereon, is free to force arbor 4 back through opening 58 against the action of spring 69. As the finger 180 and the spool 8 push the arbor back, they enter into the coil 186 which has been formed on the arbor. In this manner, the spool 8 is inserted into the coil; however, finger 180 and spool 8 are in relatively tight engagement, and withdrawal of finger 180, will take with it the spool 8 and, in addition, the finished coil 186. At this time, rotation of barrel cam 168 starts to cause the tail stock assembly 6 and the finger loading assembly 7 to return to their original position. When finger assembly 7 arrives opposite conveyer chain 10 having extending pegs 9, the barrel cam 168 is provided with a dwell to cause assembly 7 to remain there temporarily. During this dwell, face cam 176 is so formed as to cause stripper member 182 to move forward to the right, as viewed in FIGURE 10, thereby pushing the complete coil and spool off finger 180 and onto peg 9 of conveyer chain 10. Face cam 176 then causes stripper member 182 to return to its normal position and barrel cam 168 then continues to move the tail stock assembly 6 and finger assembly 7 until they are again in the position shown in FIGURE 2.

Referring now to FIGURES 1, 2, 4, 15 through 21 and 23 through 26, the complete operation of the improved machine of this invention will be described. While the electrical control circuitry and the camming control arrangements in connection with the various parts already described have not yet been explained, it is believed that a full understanding of them will be derived from an explanation of their function as the function of the entire machine is explained. Referring now particularly to FIGURE 4, when the machine is started from rest, switch 187 is closed into engagement with contact 188 to provide alternating current power across lines 33 and 34. This action will energize motor 191 across lines 192 and 193. Motor 191 is connected through a clutch mechanism 194 and a shaft 195 to sprocket 196 which drives conveyor chain 10 having pegs 9 extending therefrom at spaced intervals. However, at this time, clutch 194 will keep motor 191 disconnected from shaft 195 because, while the clutch is connected to line 33 through a line 197, the other connection to line 34 through line 198 is interrupted by normally open contact 199 of a relay 200. Thus, motor 191 will run but will not operate conveyer chain 10. The closing of switch 187 will also cause energization of brake 12 which controls the tension of wire 1 coming from wire spool 2 as set forth in detail hereabove. Also, motor 51 will be energized through lines 52 and 53 as described above, to cause rotation of sprocket 50 and thereby cause chain 48 to act through sprocket 49 to rotate roller 42 in the adhesive container 44. Also, motor 170 is energized through lines 201 and 202 but, as previously explained, the movement from motor 170 is not, as yet, transmitted through shaft 169 because the combined clutch and gear mechanism 171 will not transmit the movement from motor 170 until the circuit from line 203 to the clutch is completed through line 204 and contact 205. The closing of switch 187 will also energize the main drive motor speed control 206 which is connected across a rectifier 207 by lines 208 and 209. Rectifier 207 is in turn connected across the power source by lines 210, 211 and 212. However, while the circuit to control 206 is complete, the circuit to the main drive motor 213 through lines 214, 215 and 216 must be completed across bridging contact 218 of relay 219 before the control 206 becomes effective. Main drive motor 213 is normally driven on direct current power because such power lends itself best to accurate rapid speed control.

In addition, when switch 187 is closed, solenoid coil 47 is energized through lines 220 and 221 on the one side and through line 222, contact 223, bridging contact 224, contact 225, line 226 and line 212 on the other side. This circuit, it will be observed, is completed through bridging contact 224 which is controlled by cam 227 whose action will be further explained herebelow. As discussed earlier, the energization of solenoid coil 47 raises rod 41 and, consequently, roller 40 so that wire 1 is out of engagement with roller 42 at the start of the operation. This is necessary because of the fact that roller 42 deposits adhesive on wire 1, and the operation of the machine will become fouled if adhesive is deposited on the wire forming a first layer of the coil since the adhesive would then come into contact with the arbor. For this reason it is necessary to maintain wire 1 out of contact with roller 42 while the first layer of each coil is wound, after which the wire is allowed to return into contact with roller 42 to receive the adhesive therefrom. As explained, the solenoid coil 47 will maintain wire 1 out of contact with roller 42 from the start of the operation; the de-energization of coil 47 at the end of the winding of the first layer of each coil will be explained herebelow.

When the machine is ready for operation, winding head 5 is in the position shown in FIGURE 15 with finger 91 in its position within recess 90 so as to clamp wire 1 as explained before. Also, arbor 4 is in its operative position extending out from the face of winding head 5 and latched in that position as explained previously (see FIGURE 8). Insofar as the entire machine is concerned, the parts are relatively positioned as shown in FIGURE 23, with tail stock assembly 6 in engagement with arbor 4 extending from the face of winding head 5, and finger loading assembly 7 in alignment with the foremost spool 8 on chute 181. Traversing pulley 3 is positioned in line with that portion of arbor 4 which is adjacent winding head 5.

At this point, with switch 187 closed and all the parts in the positions described, the machine is ready for operation. It is to be observed, incidentally, that switch 187 may be retained in closed position and that the machine will not operate, but will merely be in readiness for operation.

For operation of the machine, push-button 228 is momentarily depressed across contacts 229 and 230. Provided the wire tension of wire 1 is correct and that switch 28 has contacts 38 and 39 connected, a circuit will be completed through line 231, coil 232 of relay 233, line 234, switch 28, line 235, line 236, push-button 228 and lines 237 and 238. Relay 233 will then close and will lock itself into closed position by means of line 239, relay contact 240 and line 241 so as to by-pass the push-button switch 228. The other relay contact 242 will, of course, also be closed and this will complete a circuit through line 243, normally closed contact 244 of solenoid 245, line 246, line 247, contact 242, line 248, and coil 249 of relay 219. Relay 219 will then close and will seal itself in through line 251, its own contact 252, and line 253 thereby by-passing the circuit dependent upon contact 242 of relay 233.

As previously stated, the circuit for energization of main drive motor 213 is dependent upon the closing of contact 218 of relay 219. Thus, when relay 219 closes contact 218 closes, the main drive motor 213 will be energized and, as will be discussed below, will start rotation of winding head 5 through gears 254 and 255, and shaft 62. From this point on, if the wire tension of wire 1 should become too great and break the wire despite the controlling action of the brake 12, or if supply spool 2 should be depleted of wire, switch 28 will open the circuit to coil 232 thus deenergizing it and opening the relay 233. This will prevent a starting of another cycle to form another coil, as will appear below; however, in order to be sure that the machine is always ready to start an operation when it stops, relay 219 will remain in, because it has sealed itself in as previously described, and the machine will therefore complete one coil-forming cycle and will then stop as will be described below.

As stated the starting of motor 213 will cause rotation of winding head 5 to commence. It will be observed at this point that latch 124 is in its up position out of engagement with recess 125 in winding head 5 because of the fact that coil 129 of solenoid 245 is de-energized and therefore, bar 127 is in its downward position and is pivoting latch 124 upwardly. As seen in FIGURES 16 and 24, winding head 5 starts to rotate and, with the wire 1 clamped to finger 91 as previously explained, the wire will start to be wound on arbor 4.

In addition to operating winding head 5, motor 213 operates cams 256, 257, 258, and 227 through gears 254, 255, and 259, and shaft 260 on which the cams are mounted. In addition, motor 213 operates a drive mechanism 261 which provides intermittent axial movement of the traverse pulley 3. One such mechanism which is in common usage is known in the trade as a Ferguson intermittent drive. As schematically shown, the mechanism includes a cam member 262 which is rotated by motor 213 through gears 263, 264, 265 and 266 at the same speed as the winding means. An upstanding flange 267 extends around the major portion of the periphery of member 262 substantially in the center thereof. For a predetermined arcuate portion, during which movement of pulley 3 is desired, flange 267 departs from its previous line of travel and slants toward one edge of member 262, as shown at 268. A member 269 has a plurality of cam follower rollers 270 distributed about its surface, with each roller being arranged to engage flange 267 for a predetermined angular position of member 269. Thus, a roller will follow the flange 267 around the major portion of the periphery of member 262 and, as can be seen, no rotation will occur. During the last portion, however, as the roller follows part 268 of flange 267, a predetermined turning of member 269 will be effected. This turning is transmitted through gears 271 and 272 to a heart-shaped cam 273 having followers 274 secured to a member 275 which rotatably supports traverse pulley 3 by means of a shaft such as 276. Thus, for each rotation of member 262, cam 273 will cooperate with the cam followers 274 to cause a small predetermined transverse movement of traverse pulley 3, substantially equal to the distance between the centers of adjacent grooves 131 of fingers 73 (FIGURE 28), during a predetermined portion of each revolution of winding head 5 and arbor 4. The provision of traversing pulley 3 is important because of the necessity of causing wire 1 to move from one end of arbor 4 to the other so as to form successive turns of each layer and successive layers. For maximum saving of space and material, particularly in connection with small-diameter wire, it is desirable that the cross-over of the wire to a position where it can form the next adjacent turn should always occur on the same side of the coil. It is for this reason that the Ferguson drive is provided in synchronization with winding head 5; because of the fact that movement of pulley 3 occurs only during 90 degrees for each 360 degrees of rotation of member 262, this movement will occur during only a quarter of each revolution of both the member 262 and of the winding head 5 and arbor 4. In this manner, with a square coil as shown, the wire will cross-over only during the winding of a particular predetermined side of the coil, because the movement of traversing pulley 3 axially of arbor 4 will occur only when the wire is being wound on that particular side of the coil. The shape and size of cam 273 are such as to provide the correct amount of motion to the traversing pulley 3 and to reverse its movement at the correct time when the end of a layer is reached by the wire. In addition, it is, of course, necessary that the cross-over occur between the grooved fingers 73 since otherwise the grooves will act to prevent the wire from crossing over. It will, of course, be understood that the particular means of achieving intermittent motion, and the particular proportions used are for illustrative purposes only. Any desired means of providing regulated intermittent motion may be provided; also, the proportion of time during which motion is provided will vary with the coil shape. Thus, if the coil were rectangular or had a different number of sides or were circular or elliptical rather than being square as show, the arcuate extent of motion might depart substantially from the 90 degrees used in this case.

The rotation of motor 213 will now cause winding head 5 to rotate and effect the formation of a coil on arbor 4. In this connection, FIGURE 16 shows the position of the elements of the winding head after half a turn of the operation has been effected. In addition, FIGURE 17 shows the winding head after the first complete turn of wire has been formed. Reference to FIGURE 24 will further show the relationship of the parts of the machine after the winding operation starts; in this figure, it will be seen that all parts remain in the same relationship with the exception that, as can be seen by the position of recess 125 and finger 91, head 5 has started to rotate to cause the wire to form the turns on arbor 4.

After winding head 5 has caused the formation of the first complete layer of wire 1 on arbor 4, as shown in FIGURE 18, motor 213 will have caused shaft 260 to rotate cam 227 sufficiently to drop bridging contact 224 out of engagement with contacts 223 and 225. This action de-energizes solenoid coil 47 and, consequently rod 41 controlled by the solenoid and roller 40 will drop down and allow wire 1 to move into contact with roller 42 so that the wire will then receive adhesive. Consequently, all wire wound after the first layer will adhere to the adjacent turns of wire on which it nests so that the coil will form itself into a solid self-supporting mass with each turn immovable relative to its neighbors. Coil 47 remains de-energized through the end of the winding operation so that the entire remainder of the coil formed on arbor 4, after the first layer, is provided with the adhesive coating. As the end of the winding operation is approached, shaft 260 is rotated sufficiently to cause cam 258 to raise bridging contact 277 into engagement with lines 278 and 279 extending from motor control 206. This effects a deceleration of the motor which is necessary when motor 213 provides high-speed operation of winding head 5, since it is not possible to effect substantially instantaneous stops of high speed motors with the degree of precision necessary in a winding operation such as that performed in that instant case.

Somewhat less than a full turn before the end of a winding cycle, shaft 260 will have rotated sufficiently to cause cam 257 to move bridging contact 280 up into engagement across lines 281 and 282. A circuit is then completed through lines 283, 284, 282, contact 280, lines 281 and 285, and coil 286 of relay 287. A circuit is also completed, starting from line 281, through line 288 and coil 289 of relay 290. The closing of relay 287 will close bridging contacts 291 and 292 and similarly the closing of relay 290 will cause contacts 293 and 294 to close. Relay coil 287 is then locked into energized position through a circuit which includes the coil 286, line 295, line 296, contact 294, line 297, line 298, contact 292, and lines 299, 284 and 283. Relay 290 is locked into position through line 300, contact 293, line 301, contact 302 controlled by cam 303 (which is operated through motor 170 and gear and clutch mechanism 171, and is closed at the present time), line 304, and coil 289. It will be understood that it is necessary to seal the relays into closed position because of the fact that the cams actuating the contacts which complete the circuits through the relays initially do not generally remain in position to keep the contact closed during the entire time that it is desired to energize the relay.

The closing of contact 291 completes a circuit through lines 283 and 305, contact 291, coil 129 of solenoid 245, and line 306. The energization of coil 129 will cause solenoid 245 to be moved to its raised position to open contacts 244 and 307 and close contact 308. The raising of solenoid 245 carries with it bar 127 with the result that latch 124 is moved downwardly. Since winding head 5 has already started on its last revolution, the latch 124 is not aligned with recess 125 and will ride on the surface of the winding head 5 until the end of the last revolution is reached, at which time the latch will fall into the recess to lock the winding head into finishing position.

At the same time that cam 257 closed contact 280, that is, less than a full turn before the end of a winding cycle, cam 256 will move contact 309 to its closed position. This will complete a circuit through line 310, contact 309, line 311, coil 312 of relay 313, and line 319. Relay 313 will then be moved to a position where the two contacts 314 and 315 are in their closed position. Relay 313 will then be locked into this position by a circuit passing through line 319, coil 312, line 316, contact 314, line 317, contact 307 of solenoid 245, and line 318. A circuit is also completed through line 319, line 320, contact 315, line 321, solenoid valve 322, line 323 and line 306. The completion of this circuit energizes the solenoid valve 322 which in turn actuates air cylinder 324 which pulls on rod 106 so as to pivot clevis 99 about part 101 and force finger 91 out of recess 90, as previously explained and set forth in connection particularly with FIGURES 5 and 6.

At this time, cam 227 closes contact 224 to energize solenoid coil 47 to pick up roller 40 lifting the wire off adhesive applicator roller 42. The distance between roller 42 and arbor 4 is such that there is sufficient wire left with adhesive on it to insure bonding of the last turn.

When finger 91 is moved out of recess 90, the start end of the coil is released and kicked out of the holding jaws. The finger is moved out far enough axially along portion 64 of arbor 4, as previously explained, so that the finished end of the coil passes behind it, between it and the winding head. The situation where the finger 91 has been moved out near the end of a winding operation can be seen in FIGURE 19 which shows that the finger is in its outward position and has just started to move so that the wire is between it and cover 54 of winding head 5. In addition, it will be seen the moving out of finger 91 has released starting end 325 of the coil positioned on arbor 4. Reference to FIGURE 20 shows that as the winding head 5 continues the last rotation of the cycle, finger 91 moves to carry the wire between it and the front cover 54 of the winding head 5.

The opening of contact 244 because of the energization of solenoid coil 129 during the last rotation of the cycle causes de-energization of coil 249 of relay 219. Consequently, contacts 252 and 218 are opened, and the opening of contact 218 removes power from the main drive motor 213. Contact 307, which was opened at the same time as contact 244, causes the de-energization of coil 312 of relay 313, thus opening contacts 314 and 315. The opening of contact 315 de-energizes solenoid valve 322 with the result that spring 69 (FIGURE 6) is free to force finger 91 back into recess 90 in winding head 5. This moves the finger 91 to the position shown in FIGURE 21, so that, as explained in connection with FIGURES 3, 5, 6, 8 and 9, cutter blade 113 cuts off the finishing end 326 of the wire at the same time that starting end 327 of the next coil to be formed is gripped between blocks 107 and 109 (FIGURE 3).

The closing of contact 308 by energization of coil 129 of solenoid 245 completes a circuit through line 328, line 329, line 330, contact 308, line 331, solenoid valve 332, and line 333 thereby to energize solenoid valve 32. This valve in turn shuts off air cylinder 334 which permits spring 157 (FIGURE 11) to disengage the wedge 77 of tail stock assembly 6 from winding arbor 4. As previously explained, the removal of wedge 77 from arbor 4 permits springs 78 to collapse fingers 73 within recesses 80. The actuation of air cylinder 334 also closes contacts 335 and 205; the closing of the former completes a circuit through line 337, contact 335, line 338, solenoid valve 89 and line 339 so as to energize the solenoid valve 89. This actuates air cylinder 340 which forces pusher 87 against part 86 of latch 81, against the action of spring 88 on pusher 87 and the action of spring 83 within winding head 5 (FIGURE 8). This action disengages latch 81 from grove 82 in arbor portion 63 so that the arbor 4 is no longer locked in its operative winding position, as previously explained.

At the same time that the foregoing action is effected, a circuit is completed through line 203, mechanism 171, line 204, contact 205, and line 341. This provides power to the combined gear reduction and clutch mechanism 171 so that motor 170 will then cause rotation of shaft 169. Rotation of shaft 169 will (referring to FIGURE 2) first cause cam 177 to move finger 180 forward to pick up an empty spool 8 (this position of the machine may be observed in FIGURE 25, where the winding operation has been completed, but the tail stock assembly 6 has not yet been removed), and withdraw with the spool. Barrel cam 168 will then move both the tail stock assembly 6 and the finger loading assembly 7 so that the tail stock assembly moves out of alignment with arbor 4 and the finger loading assembly moves into alignment with the arbor. Assemblies 6 and 7 will then remain in this position while cam 177 causes the finger 180 with spool 8 thereon to enter the finished coil and abut the end of arbor portion 64 to push arbor 4 back into winding head 5 against the action of spring 69. This is made possible by the fact that the fingers 73 of the arbor 4 have been depressed, and thus the wire is no longer seated tightly in the positioning grooves in the fingers. It is therefore possible for the finger 180 and spool 8 to slide the arbor out from within the coil and take its place therein. FIGURE 9 provides a detailed view of the winding head 5 at this point, and FIGURE 26 shows the relationship of the various parts of the entire machine.

The rotation of shaft 169 now causes cam 177 to withdraw loading finger 180, taking with it the assembly of spool 8 and finished coil 186 and permitting spring 69 to force arbor 4 back into position. Barrel cam 168 now causes tail stock assembly 6 and finger loading assembly 7 to start to return to their original positions; this movement is temporarily arrested when the finger loading assembly 7 carrying coil 186 and spool 8 has moved into alignment with peg 9 on chain conveyer 10 (FIGURE 10). At this point, cam 176 causes supporting members 183 to move relative to rod 164 so that stripper member 182 slides over finger 180 against the end of spool 8 and finished coil 186. Further movement of supporting members 183 relative to rod 163 will cause the stripper member to force the spool and coil onto peg 9 on conveyer chain 10 (FIGURE 27). Thereafter, cam 176 returns supporting members 183 to their originnal position while tail stock assembly 6 and finger loading assembly 7 are moved by barrel cam 168 so that the tail stock assembly is back in alignment with arbor 4. At this point, splined shaft 169 has completed its full cycle.

Referring again to FIGURE 4 primarily, cams 303, 342 and 343 are secured to shaft 169 so as to rotate therewith. After the apparatus controlled by shaft 169 has completed approximately 10 percent of its cycle, cam 342 closes bridging contact 344. This will, in effect, complete the circuit through relay coil 286 through line 345, contact 344, and line 346 thereby ensuring that relay 287 will remain closed regardless of the energization of coil 289 of relay 290. At approximately 50 percent of the cycle of the apparatus actuated through shaft 169, cam 303 permits spring 347 to open contact 302 thereby de-energizing relay coil 289 and opening contacts 293 and 294. Near the end of the cycle of shaft 169, at approximately 95 percent of completion thereof, cam 343 moves contact 348 into closed position to complete a circuit through line 328, line 329, line 349, contact 348, line 350, and coil 200 of relay 351. Energization of coil 200 causes contacts 199 and 353 to move to their closed positions. Relay 351 is then locked into its closed position by completion of a circuit through line 328, line 354, line 355, contact 353, line 356, contact 357 which is maintained in closed position by cam 358, line 359, and relay coil 200. A circuit is also completed through line 197, clutch 194, line 198, contact 199, line 360, line 354, and line 328 to provide power to clutch 194. This engages the clutch so that motor 191 starts to operate shaft 195 and sprocket 196 to drive conveyer chain 9. After the motor 191 has caused sufficient rotation of sprocket 196 to position an empty peg 9 in readiness to receive a spool 8 and finished coil 186 from finger 180, cam 358 has moved sufficiently to permit spring 361 to open contact 357 to de-energize coil 200 and drop out relay 351. This causes contacts 199 and 353 to move to their open positions and consequently the circuit through clutch 194 is opened and movement of conveyer chain 10 ceases.

After the cycle of shaft 169 has been completed, cam 342 opens contact 344 thereby de-energizing coil 286 and dropping out relay 287 with is contacts 291 and 292. The opening of contact 291 de-energizes coil 129 of solenoid 245 and consequently latch 124 is pivoted out of engagement with recess 125 in winding head 5 so that the winding head is ready for the next winding operation. The de-energization of coil 129 causes contacts 244 and 307 to close, and contact 308 to open. The closing of contact 307 provides the proper connections so that relay coil 312 of relay 313 can subsequently be energized again at the proper point in the cycle, as explained above. The opening of contact 308 de-energizes solenoid valve 332, thereby causing cylinder 334 to effect forward movement of wedge 77 so that it will again engage ends 75 of fingers 73 of arbor 4. The closing of contact 244 energizes coil 249 of relay 219 to complete the circuit through main drive motor 213 through contact 218 thereby causing the motor to start.

The movement of cylinder 334 moves contacts 335 and 336 to their open positions. Contact 205 will open the circuit through gear and clutch mechanism 171 to stop rotation of shaft 169. The opening of contact 335 de-energizes solenoid valve 89 to cause re-engagement of latch 81 in groove 82 of part 63.

Thus, a complete cycle has been finished and another one simuleaneously has been started to form a new coil. It will be seen from the foregoing that this invention provides a machine which forms coils for stationary induction apparatus in a precise manner so as to eliminate both the requirement for layers of paper intermediate the layers of wire and the need for a supporting inner spool during winding, and so as to economize on space and material while providing the same effective number of turns. It will further be seen that this machine effects the operation quickly and completely. In addition, it will be observed from FIGURE 1 that, while a single unit machine has been explained, the machine may be constructed with any desired number of units all the same kind utilizing a single actuating arrangement as set forth in FIGURE 4. It will thus be understood that, while the machine has been explained by describing it as a single unit, it may be used as such, or as a multiple unit machine. In addition, it will be understood that while all parts have been described in complete detail so as to set forth an operative machine, many variations are possible without departing in any way from the spirit of the invention. Therefore, while the invention has been explained by describing a particular embodiment thereof, it will be apparent that improvements and modifications may be made without departing from the scope of the invention as defined in the appended claims.

What I claim as new and desire to secure by Letters Patent of the United States is:

1. A machine for forming wire into coils comprising winding means including a longitudinally movable and rotatable arbor on which the coils are formed, means for placing the wire under a predetermined tension as it is fed to said winding means, a wire traversing member in contact with the wire being fed to said arbor and arranged to determine the location of the wire relative to the longitudinal axis of said arbor, adhesive supply means, means for moving said member axially of said arbor a predetermined amount during a predetermined part of each revolution of said arbor thereby to cause the wire to cross over to form a new turn at the same peripheral location each revolution, means normally in contact with the wire between said tensioning means and said arbor and connected to said adhesive supply means for coating at least part of the surface of the wire with adhesive before it reaches said winding means, and means actauted by said winding means at predetermined times for maintaining the wire out of contact with said coating means during a predetermined portion of the winding operation.

2. A machine for forming wire into coils comprising winding means including a longitudinally movable arbor on which the coils are formed, means for placing the wire under a predetermined tension as it is fed to said winding means, adhesive supply means, a first roller member connected to said adhesive supply means positioned between said tensioning means and said winding means for coating at least part of the surface of the wire with adhesive before it reaches said winding means, a second roller member and means actuated by said winding means at predetermined times for moving said second roller member in contact with the wire so as to prevent contact of the wire with said first roller member, and means for engaging an end of said arbor and for moving said arbor longitudinally out from within a formed coil, said arbor engaging means being arranged to enter within the formed coil to carry a spool of insulating material into tight engagement with the inner surface thereof.

3. A machine for forming wire into coils comprising winding means including a longitudinally movable an rotatable arbor, adhesive supply means, means normally in contact with the wire and connected to said adhesive supply means for coating at least part of the surface of the wire with adhesive before it reaches said winding means, means actuated by said winding means at predetermined times for maintaining the wire out of contact with said coating means, means actuated by said winding means for engaging an end of said arbor and for moving said arbor longitudinally out from within a formed coil, said arbor engaging means being arranged to carry a spool of insulating material into tight engagement with the inner surface of the formed coil, a rotatable wire transversing member in contact with the wire being fed to said arbor and arranged to determine the location of the wire relative to the longitudinal axis of said arbor, and means actuated by said winding means for moving said rotatable wire traversing member axially of said arbor a predetermined amount each time the wire is wound over said arbor thereby to cause the wire to cross over to form a new turn at the same peripheral location each revolution.

4. A machine for forming wire into coils comprising winding means including an arbor, means for placing the wire under a predetermined tension as it is fed to said arbor, a member movable in response to the tension in said wire and movable to an extreme position when the wire tension decreases to a predetermined value, means responsive to the position of said member for maintaining said predetermined position, switch means operable by said member when the same is in said extreme position, means actuated by said switch means and coupled to said winding means for stopping the same, control means independent of said switch means and coupled to said winding means for continuing operation of the same for a predetermined time after actuation of said switch means, adhesive supply means, means normally in contact with said wire between said tensioning means and said arbor and connected to said adhesive supply means for coating at least part of the surface of said wire with adhesive before it reaches said winding means, and means actuated by said winding means at predetermined times for maintaining the wire out of contact with said coating means.

5. A machine for forming wire into coils comprising winding means including a longitudinally movable and rotatable arbor on which the coils are formed, a rotatable wire traversing member in contact with the wire being fed to said arbor and arranged to determine the location of the wire relative to the longitudinal axis of said arbor, means for moving said member axially of said arbor a predetermined amount during a predetermined part of each revolution of said arbor thereby to cause the wire to crossover to form a new turn at the same peripheral location each revolution, means adapted to engage an end of said arbor and to move said arbor longitudinally out from within a formed coil, said arbor engaging means being arranged to enter within the formed coil to carry a spool of insulating material into tight engagement with the inner surface thereof, said arbor engaging means further being adapted to remove said spool with said coil thereon from said winding means and to transport it to a predetermined location, means for actuating said arbor engaging means at predetermined times, said arbor engaging means including means actuated by said actuating means at other predetermined times for forcing said spool and formed coil therefrom, and means at said predetermined location cooperable with said arbor engaging means for accommodating said spool and formed coil forced therefrom.

6. A machine for forming wire into coils comprising winding means including a rotatable arbor having a predetermined number of sides, a rotatable wire traversing member in contact with the wire being fed to said arbor and arranged to determine the location of the wire relative to the longitudinal axis of said arbor, means actuated by said winding means for moving said rotatable wire traversing member axially of said arbor a predetermined amount each time the wire is wound over a predetermined side of said arbor thereby to cause the wire to crossover to cause a new turn at said predetermined side each revolution, means for placing the wire under a predetermined tension as it is fed to said winding means, switch means actuated by said tensioning means when the wire tension decreases to a predetermined value, said switch means being coupled to said winding means for stopping the same responsive to actuation of said switch means, and control means independent of said switch means and coupled to said winding means for continuing operation of the same for a predetermined time after actuation of said switch means.

7. A machine for forming wire into coils comprising winding means, means for placing the wire under a predetermined tension as it is fed to said winding means, said tensioning means including a member movable in response to the tension in said wire and movable to an extreme position when the wire tension decreases to a predetermined value, means responsive to the position of said member for maintaining said predetermined tension, switch means operable by said member when the same is in said extreme position, means actuated by said switch means and coupled to said winding means for stopping the same, and control means independent of said switch means and coupled to said winding means for continuing operation of the same for a predetermined time after actuation of said switch means.

8. A machine for forming wire into coils comprising winding means including a longitudinally movable and rotatable arbor on which the coils are formed, a wire traversing member in contact with the wire being fed to said arbor and arranged to determine the location of the wire to the longitudinal axis of said arbor, means for moving said member axially of said arbor a predetermined amount during a predetermined part of each revolution of said arbor thereby to cause the wire to crossover to form a new turn at the same peripheral location each revolution, means for placing the wire under a predetermined tension as it is fed to said winding means, said tensioning means including control means therefor comprising a pair of rigidly mounted rotatable pulleys, a movable member intermediate said pair of pulleys, a third pulley rotatably mounted on said movable member intermediate said two stationary pulleys, said stationary pulleys being adapted to have the wire pass beneath them and said movable pulley being adapted to have the wire pass over it, said member being movable in response to the tension in the wire and movable to an extreme position upon breaking of the wire, means controlled by the position of said member for maintaining said predetermined tension, switch means actuated by said member when the same is in said extreme position, means actuated by said switch means and coupled to said winding means for stopping the same, and control means independent of said switch means and coupled to said winding means for continuing operation of the same for a predetermined time after actuation of said switch means.

9. A machine for forming wire into coils comprising winding means including a longitudinally movable and rotatable arbor having a predetermined number of sides, a rotatable wire traversing member in contact with the wire being fed to said arbor and arranged to determine the location of the wire relative to the longitudinal axis of said arbor, means actuated by said winding means for moving said rotatable wire traversing member axially of said arbor a predetermined amount each time the wire is wound over a predetermined side of said arbor to cause the wire to crossover to form a new turn at said predetermined side each revolution, means for placing the wire under a predetermined tension as it is fed to said winding means, adhesive supply means, a first roller member connected to said adhesive supply means positioned between said tensioning means and said winding means in contact with the wire and arranged to pick up adhesive to coat at least part of the surface of the wire, a second roller member, and means actuated by said winding means at predetermined times for moving said second roller member into contact with the wire so as to prevent contact of the wire with said first roller member thereby to prevent application of adhesive to the wire.

10. A machine for forming wire into coils comprising winding means, a container for a supply of adhesive, a first roller member rotatably mounted in said container to pick up adhesive, means for rotating said roller, said roller being normally arranged in contact with the wire thereby to coat at least part of the surface of the wire, a second roller member, and means actuated by said winding means at predetermined times for moving said second roller member into contact with the wire so as to lift the wire from said first roller member thereby to prevent application of adhesive to the wire.

11. A machine for forming wire into coils comprising winding means including a rotatable arbor on which the coils are formed, a wire traversing member in contact with the wire being fed to said arbor and arranged to determine the location of the wire relative to the longitudinal axis of said arbor, and means for moving said member axially of said arbor a predetermined amount during a predetermined part of each revolution of said arbor thereby to cause the wire to crossover to form a new turn at the same peripheral location each revolution.

12. A machine for forming wire into coils comprising winding means including a rotatable arbor having a predetermined number of sides, a rotatable wire traversing member in contact with the wire being fed to said arbor and arranged to determine the location of the wire relative to the longitudinal axis of said arbor, and means actuated by said winding means for moving said rotatable member axially of said arbor a predetermined amount each time the wire is wound over a predetermined side of said arbor thereby to cause the wire to crossover to form a new turn at said predetermined side each revolution.

13. A machine for forming wire into coils comprising winding means, means for supplying wire to said winding means, means for placing the wire under a predetermined tension as it is fed from said wire supplying means to said winding means, said tensioning means including a member movable in response to the tension in said wire and movable to an extreme position when the wire tension decreases to a predetermined value, means responsive to the position of said member for maintaining said predetermined tension, switch means operable by said member when same is in the extreme position, said winding means including a rotatable arbor having a predetermined number of sides, at least a portion of the surface of said arbor being provided with a plurality of equispaced grooves along its operative axial length each adapted to receive and position part of a single turn of the wire, a wire traversing member in contact with the wire being fed to said winding means and arranged to determine the location of the wire relative to the longitudinal axis of said arbor, means actuated by said switch means and coupled to said winding means for stopping said winding means, control means independent of said switch means and coupled to said winding means for continuing operation of said winding means for predetermined times after actuation of said switch means, means actuated by said winding means for moving said member axially of said arbor an amount substantially equal to the distance between groove centers while the wire is being wound over a predetermined side of said arbor thereby to cause the wire to crossover to form a new turn each time the wire is wound over said predetermined side of said arbor.

14. A machine for forming wire into coils comprising winding means, means for supplying wire to said winding means, means for placing the wire under a predetermined tension as it is fed from said wire supply means to said winding means, said tensioning means including a member movable in response to the tension in said wire and movable to an extreme position when the wire tension decreases to a predetermined value, means responsive to the position of said member for maintaining said predetermined tension, switch means operable by said member when the same is in said extreme position, said winding means having a centrally located axial opening, an axially movable arbor having a portion supported within said opening and having an operative part normally extending in front of and coaxially with said opening, spring means within said opening bearing against said arbor portion to bias said arbor to its operative position, latch means to lock said arbor into operative position during a coil forming operation, means for moving said latch means to release said arbor, means actuated by said switch means and coupled to said winding means for stopping said winding means, control means independent of said switch means and coupled to said winding means for continuing operation of the winding means for a predetermined time after actuation of said switch means, means engageable with said arbor for moving the same against said spring biasing means to a position entirely axially displaced from its operative coil winding position substantially within said opening whereby said arbor is entirely removed from within a wound coil and means normally in contact with the wire supplied to said winding means for coating at least part of the surface of the wire with an adhesive before it reaches said winding means.

15. A machine for forming wire into coils comprising a rotatable winding head including an arbor having a wire receiving portion secured to said winding head so as to rotate coaxially therewith, means for supplying wire under predetermined tension to said receiving portion, axially movable means secured to said winding head, said movable means being radially spaced from and normally axially removed from the wire receiving portion of said arbor, said winding head having a centrally located axial opening, spring means within said opening arranged to bias said arbor out of said opening, said arbor being movable against said spring means to a second position where said arbor is moved substantially into said opening and is axially displaced from its operative position, clamping means on said winding head cooperable with said movable means in its normal position to clamp the starting end of the wire, means for moving said movable means into a second position axial alignment with a part of said wire receiving portion of said arbor at a predetermined time during the coil forming operation and for maintaining said movable means in said second position thereof for less than a full revolution of said winding head so that the starting end of the coil is released and the wire being wound passes between said movable means and the face of said winding head, said moving means being operative at another predetermined time to return said movable means to its normal position to clamp part of the wire that passed between said movable means and said winding head to provide a new starting end for the next coil to be formed, and cutting means on said winding head cooperable with said movable means upon its return to cut the wire beyond the clamped part of the wire to release the finish end of the formed coil.

16. A machine for forming wire into coils comprising a rotatable winding head including an arbor having a wire receiving portion secured to said winding head so as to rotate coaxially therewith, means for supplying wire to said winding head under predetermined tension, adhesive supply means, means normally in contact with the wire supplied to said receiving portion for coating at least part of the surface of the wire with adhesive before it reaches said receiving portion, means for at predetermined times maintaining the wire out of contact with said coating means, said winding head having a recess formed in its face radially spaced from said arbor, axially movable means secured to said winding head and normally seated in said recess, means biasing said axially movably means into said recess, said winding head having a centrally located axial opening, spring means within said opening arranged to bias said arbor out of said opening, said arbor being movable against said spring means to a second position where said arbor is moved substantially into said opening and is axially displaced from its operative position, clamping means cooperable with said movable means when it is in said recess to clamp the starting end of the wire, means for moving said movable means out from said recess against the action of said biasing means into a second position in axial alignment with a part of said wire receiving portion of said arbor at a predetermined time so that the starting end of a formed coil on said arbor is released and the wire being wound passes between said movable means and the face of said winding head, said biasing means being operative at another predetermined time to return said movable means to its position within said recess to clamp part of the wire that passed between said movable means and said winding head to provide a new starting end for the new coil to be formed, and cutting means on said winding head cooperable with said movable means when it is located within said recess to cut the wire beyond said clamped part to release the finish end of the formed coil.

17. A machine for forming wire into coils comprising a rotatable winding head including an arbor having a wire receiving portion and secured to said winding head so as to rotate coaxially therewith, means for supplying wire to said winding head under predetermined tension, means normally in contact with the wire supplied to said winding head for coating at least part of the surface of the wire with adhesive before it reaches said winding head, means for at predetermined times maintaining the wire out of contact with said coating means, a rod member extending through said winding head in axially movable relation therewith, a finger member secured at an end of said rod member in the front of said winding head radially spaced from and normally axially removed from the wire receiving portion of said arbor, said winding head having a centrally located axial opening, spring means within said opening arranged to bias said arbor portion out of said opening, said arbor being movable against said spring means to a second position where a part of said arbor is moved substantially into said opening and is axially displaced from its operative position, said arbor part having a substantially uniform cross section along the length thereof and being arranged to have a coil formed thereon when it its operative position, means biasing said finger member against the face of said winding head, clamping means on said winding head cooperable with said finger member in its normal position to clamp the starting end of the wire, means for causing axial movement of said rod to move said finger member into axial alignment with a part of said wire receiving portion of said arbor at a first predetermined time so that the starting end of a formed coil is released and the wire being wound passes between said finger member and the face of said winding head, said finger biasing means being operative at another predetermined time subsequent to said first predetermined time to return said finger member to its previous position to clamp part of the wire that passed between said finger member and said winding head to provide a new starting end for a new coil to be formed, and cutting means on said winding head cooperable with said finger means upon its return to cut the wire beyond said clamped part to release the finish end of the formed coil.

18. A machine for forming wire into coils comprising a rotatable winding head including an arbor having a wire receiving portion secured to said winding head so as to rotate coaxially therewith, means for supplying wire to said winding head under a predetermined tension, means normally in contact with the wire supplied to said winding head for coating at least part of the surface of the wire with adhesive before it reaches said winding head, means for at predetermined times maintaining the wire out of contact with said coating means, an axially movable rod extending through said winding head, a finger member secured to the front of said rod, said winding head being provided with a face having a recess therein radially spaced from said arbor, said finger member being normally seated in said recess, spring means biasing said finger member to said seated position within said recess, said winding head having a centrally located axial opening, spring means within said opening arranged to bias said arbor out of said opening, said arbor being movable against said spring means to a second position where said arbor is moved substantially into said opening and is axially displaced from its operative position, clamping means on said winding head cooperable with said finger member when it is seated in said recess to clamp the starting end of the wire, means for moving said finger into axial alignment with a part of said wire receiving portion of said arbor at a predetermined time so that the starting end of a formed coil is released from said clamping means and the wire being wound passes between said finger member and the face of said winding head, ejecting means movably secured to said winding head and operable by axial movement of said rod as it moves said finger member into said axial alignment with said part of said wire receiving portion to engage the released starting end of the coil and force it away from said finger member, said spring biasing means being operative at another predetermined time to return said finger member to its seated position within said recess to clamp part of the wire that passed between said finger member and said winding means to provide a new starting end for a new coil to be formed, and cutting means on said winding head cooperable with said finger member upon its return to the position within said recess to cut the wire beyond said clamped part to release the finish end of the formed coil.

19. A machine for forming wire into coils comprising rotatable winding means including an arbor having a wire receiving portion secured to said winding means so as to rotate coaxially therewith, said winding means comprising a main body portion and a cover member secured to the front of said main body portion, an axially movable rod member extending through said main body portion and said cover member, a finger member secured to the front of said rod member, said cover member having a recess formed therein, said finger being normally seated in said recess, spring means seated within said body portion biasing said finger member into said recess, clamping means secured within said body portion and cooperable with said finger member when in said recess to clamp the starting end of the wire, means for moving said rod in an axial direction to cause said finger member to move into axial alignment with a part of said wire receiving portion of said arbor subsequent to the start of the last revolution of said winding means during a coil forming operation so that the starting end of the coil is released and the wire passes between said finger member and said cover member, camming means secured to said rod member and movable therewith, ejecting means movably secured within said body portion and engageable by said cam member when said rod member moves said finger member into axial alignment with part of said wire receiving portion, said cam member being effective to force said ejecting means against said released starting end to force it away from said finger member, said spring member being operative subsequently to return said finger member to its position within said recess to clamp part of the wire that passed between said finger member and said cover member to provide a starting end for the coil to be formed in the next cycle, and cutting means secured within said body portion adjacent said recess in cooperative relation with said finger member when said finger member is seated in said recess and operative to cut the wire beyond said clamped part to release the finish end of the formed coil upon return of said finger member into said recess.

20. A machine for forming wire into coils comprising winding means including a winding head, said winding head having a centrally located axial opening, means for supplying wire to said winding head under predetermined tension, means normally in contact with the wire supplied to said winding head for coating at least part of the surface of the wire with adhesive before it reaches said winding head, means for at predetermined times maintaining the wire out of contact with said coating means, an arbor having a portion thereof positioned within said axial opening and supported by said winding head, spring means within said opening arranged to bias said arbor portion out of said opening, said arbor being movable against said spring means to a second position where said arbor is moved substantially into said opening and is entirely axially displaced from its operative position said arbor having a part secured to said portion within said opening and arranged to extend axially out of said opening in front of said winding head and having at least one substantially axial recess formed therein, a finger member positioned in said recess and pivotally supported at one end on said portion, said finger member having its surface formed to receive and position the wire, and biasing means secured in said portion arranged to bear against said finger member adjacent the end thereof to cause the same to pivot inwardly in said recess so that its surface is below the top of said recess, said finger member being movable against said biasing means to a position whereby its surface is at least coextensive with the top of said recess.

21. A machine for forming wire into coils comprising a winding head, said winding head having a centrally located axial opening, an arbor having a portion thereof slidably supported within said opening, means within said winding head biasing said arbor out of said opening, said arbor having a part secured to said portion within said opening arranged to extend axially out of said opening in front of said winding head and having at least one substantially axially extending recess formed therein, a finger member positioned in said recess and pivotally supported at one end on said portion, said finger member having its surface formed to receive and position the wire, biasing means secured in said portion arranged to bear against said finger member adjacent said one end thereof to cause the same to pivot inwardly in said recess so that its surface is below the top of said recess, means arranged to move into engagement with the other free end of said finger member, said finger member being movable by said movable means against said biasing means to a position where its surface is at least coextensive with the top of said recess, and latch means secured within said winding head and engageable with said arbor portion to lock the same in position when said free end of said finger is engaged by said movable means.

22. A machine for forming wire into coils comprising rotatable winding means having a centrally located substantially cylindrical axial opening, an arbor having a portion thereof slidably supported within said opening, said arbor having a part secured at one end to said portion within said opening arranged to extend axially out of said opening in front of said winding means and having a plurality of substantially axial equispaced recesses formed in the surface thereof, a plurality of finger members respectively positioned in said recesses and respectively pivotably supported at one end thereof on said portion, said finger members having their surfaces formed with a plurality of axially equispaced grooves formed to receive and position the first layer of wire, first spring means mounted in said portion and arranged to bear against the pivoted end of said fingers to cause the same to pivot inwardly in said recesses so that their surfaces are below the tops of said recesses respectively, second spring means mounted within said winding means biasing said arbor out of said winding means, latch means mounted in said winding means engageable with said arbor portion to lock said arbor into operative wire receiving position, first movable means engageable with the free ends of said fingers to bias the same outwardly against said first spring means to move said fingers to a position where their surfaces are at least coextensive with the tops of said recesses respectively, and second movable means engageable with the free end of said arbor, means for moving said first movable means into engagement with the free ends of said fingers during a coil forming operation, said latch being effective to lock said arbor in position while said first movable means is in engagement with the ends of said fingers, means for moving said second movable means against the free end of said arbor to force said arbor out from within a formed coil after a winding operation has been effected and the fingers have been collapsed by removal of said first movable means, and means effective to disengage said latch from said arbor portion when said second movable means are in engagement with the free end of said arbor to permit said arbor to be forced back into said winding means opening.

23. A machine for forming wire into coils comprising a winding head, an arbor secured at one end thereof to said winding head, said arbor having at least one axially extending recess formed therein, a finger member positioned in said recess and having its surface formed to receive and position the wire, said finger member being pivotally secured to said arbor at said one end thereof, spring means normally biasing said finger member inwardly into said recess so that its surface is below the top of said recess, movable means arranged to be moved into engagement with the free end of said finger member, said movable means being arranged to engage said finger member to move the same outwardly against said spring means to a position where its surface is at least coextensive with the top of said recess.

24. A machine for forming wire into coils comprising a rotatable winding head, an arbor secured at one end thereof to said winding head so as to be coaxial therewith, said arbor having a substantially rectangular cross section and having inwardly extending recesses formed along each edge thereof, a finger member positioned in each said recess and having its surface formed to receive and position the wire, said finger members each being pivotally secured to said arbor at the end thereof which is secured to said winding head, spring means adjacent said secured end of each finger member biasing said finger member inwardly into said recess so that its surface is below the top of said recess, each of said finger members having its other end beveled at the inner edge thereof, a tail stock assembly movable into engagement with the other ends of said finger members, said tail stock assembly including a rotatably mounted wedge shaped nose piece arranged to engage the beveled ends of said finger members respectively when said tail stock assembly is moved into operative position thereby to force said finger members outwardly against said biasing means to positions where their surfaces are substantially coextensive with the tops of said recesses.

25. A machine for forming wire into coils comprising a winding head, an arbor movably supported at one end thereof by said winding head, means secured to said winding head biasing said arbor to a first operative position, said arbor being arranged to have a coil formed thereon when in its operative position, said arbor being movable against said biasing means to a second position entirely axially displaced from its operative position, a movable loading assembly, and means for at a predetermined time moving said loading assembly to enter and firmly engage a hollow spool of insulating material having substantially the same cross sectional configuration as said arbor, said loading assembly moving means being operative at a second predetermined time to cause said loading assembly to engage the unsupported end of said arbor to force the same out of a formed coil thereon into said second position against the action of said biasing means and simultaneously to position the spool within the formed coil, said moving means being operative at a third predetermined time to move said loading assembly out of engagement with said arbor thereby to remove the formed coil and spool therefrom.

26. A machine for forming wire into coils comprising a winding head having a centrally located axial opening, an arbor having a part normally operatively positioned in front of and coaxially with said opening, said arbor having one end thereof slidably supported within said opening, means within said opening biasing said arbor to its operative position, said arbor being movable against said biasing means to a second position where said part is moved into said opening and is entirely axially displaced from its operative position, said arbor being arranged to have a coil formed thereon when in its operative position, a movable loading assembly including a finger member, and means for at a predetermined time moving said loading assembly to cause said finger member to enter and firmly engage a hollow spool of insulating material having substantially the same cross sectional configuration as said arbor part, said moving means being operative at a second predetermined time to cause said finger with a spool thereon to engage the unsupported end of said arbor and to force the same out of a formed coil thereon into said second position against the action of said biasing means and simultaneously to position the spool within the formed coil, said loading assembly being movable by said moving means at a third predetermined time to withdraw said finger member from engagement with said arbor thereby to remove the formed coil and spool therefrom.

27. A machine for forming wire into coils comprising a winding head having a centrally located axial opening, an arbor having a portion slidably mounted within said opening, said arbor further having a part secured at one end to said arbor portion and normally operatively positioned in front of and coaxially therewith, spring means within said opening arranged to bias said arbor portion out of said opening, said arbor being movable against said spring means to a second position where said part is moved substantially into said opening and is entirely axially displaced from its operative position, said arbor part having a substantially uniform cross section along the length thereof and being arranged to have a coil formed thereon when in its operative position, a movable loading assembly including a finger member, and means for at a predetermined time moving said loading assembly to cause said finger member to enter and firmly engage a hollow spool of insulating material having substantially the same cross sectional configuration as said arbor part, said moving means being operative at a second predetermined time to move said finger member into engagement with the unsupported end of said arbor part and to force the same out of the formed coil to said second position against the action of said spring means and simultaneously to position the spool within said formed coil in place of said arbor part, said loading assembly being movable by said moving means at a third predetermined time out of engagement with said arbor part to remove said finger member with the formed coil and spool thereon from said arbor part, and a stripper member supported by said loading assembly in axially movable relation to said finger member, said stripper member being formed to slide over said finger member against the end of the spool and coil thereby to remove them from said finger member.

References Cited in the file of this patent

UNITED STATES PATENTS

| | | |
|---|---|---|
| 862,935 | Pfanstiehl | Aug. 13, 1907 |
| 1,587,155 | Honan | June 1, 1926 |
| 1,726,279 | Werner | Aug. 27, 1929 |
| 2,046,981 | Vars | July 7, 1936 |
| 2,286,073 | Edick | June 9, 1942 |
| 2,371,781 | Sirp | Mar. 20, 1945 |
| 2,434,591 | Schaefer | Jan. 13, 1948 |
| 2,509,250 | Roberts | May 30, 1950 |
| 2,511,274 | Kramer | June 13, 1950 |
| 2,537,434 | Warmey | Jan. 9, 1951 |
| 2,584,208 | Holmgren | Feb. 15, 1952 |
| 2,627,379 | Moore | Feb. 3, 1953 |
| 2,681,184 | Thomas | June 15, 1954 |
| 2,698,033 | Ammann et al. | Dec. 28, 1954 |
| 2,705,978 | Caldwell | Apr. 12, 1955 |
| 2,736,346 | Ammann | Feb. 28, 1956 |